US009163521B2

(12) United States Patent
Roberts, II et al.

(10) Patent No.: US 9,163,521 B2
(45) Date of Patent: Oct. 20, 2015

(54) GAS TURBINE ENGINE WITH SUPERSONIC COMPRESSOR

(75) Inventors: William Byron Roberts, II, Wellington, NV (US); Shawn P. Lawlor, Bellevue, WA (US)

(73) Assignee: Dresser-Rand Company, Olean, NY (US)

( * ) Notice: Subject to any disclaimer, the term of this patent is extended or adjusted under 35 U.S.C. 154(b) by 28 days.

(21) Appl. No.: 13/542,669

(22) Filed: Jul. 6, 2012

(65) Prior Publication Data

US 2013/0160454 A1    Jun. 27, 2013

Related U.S. Application Data

(60) Provisional application No. 61/506,055, filed on Jul. 9, 2011, provisional application No. 61/506,064, filed on Jul. 9, 2011, provisional application No. 61/506,073, filed on Jul. 9, 2011.

(51) Int. Cl.
*F02C 9/16* (2006.01)
*F02C 9/18* (2006.01)
(Continued)

(52) U.S. Cl.
CPC *F01D 9/00* (2013.01); *F01D 1/026* (2013.01); *F01D 1/10* (2013.01); *F01D 1/16* (2013.01); *F01D 9/047* (2013.01); *F02C 3/00* (2013.01); *F02C 3/04* (2013.01); *F02C 3/06* (2013.01); *F02C 3/14* (2013.01); *F02C 7/00* (2013.01); *F02C 9/16* (2013.01); *F02C 9/18* (2013.01); *F04D 21/00* (2013.01); *F05D 2220/3216* (2013.01); *F05D 2220/3218* (2013.01); *F05D 2220/3219* (2013.01); *F05D 2240/30* (2013.01); *F05D 2240/301* (2013.01); *Y02E 20/14* (2013.01)

(58) Field of Classification Search
CPC .............. F02C 9/16; F02C 9/18; F02C 3/04; F05D 2220/3216; F05D 2220/3218; F05D 2220/3219; F05D 2240/30; F05D 2240/301; F01D 1/026; F01D 1/10; F01D 1/16; F01D 9/00; F01D 9/047; F04D 21/00
USPC .............................................. 60/39.01–39.83
See application file for complete search history.

(56) References Cited

U.S. PATENT DOCUMENTS 2,805,818 A * 9/1957 Ferri ............................. 415/148
2,974,858 A * 3/1961 Koffel et al. .................. 415/181
(Continued)

OTHER PUBLICATIONS

Penzin, "Experiemential Investigation of Supersonic Flows with Separated Regions in Ducts", Sep. 1995, Central Aerohydonamics Institute, Section 1.1.*

*Primary Examiner* — William H Rodriguez
*Assistant Examiner* — William Breazeal
(74) *Attorney, Agent, or Firm* — Edmonds & Nolte, PC

(57) ABSTRACT

A gas turbine engine having a compressor section using blades on a rotor to deliver a gas at supersonic conditions to a stator. The stator includes one or more of aerodynamic ducts that have converging and diverging portions for deceleration of the gas to subsonic conditions and to deliver a high pressure gas to combustors. The aerodynamic ducts include structures for changing the effective contraction ratio to enable starting even when designed for high pressure ratios, and structures for boundary layer control. In an embodiment, aerodynamic ducts are provided having an aspect ratio of two to one (2:1) or more, when viewed in cross-section orthogonal to flow direction at an entrance to the aerodynamic duct.

45 Claims, 17 Drawing Sheets

(51) Int. Cl.
*F02C 3/04* (2006.01)
*F01D 1/02* (2006.01)
*F01D 1/10* (2006.01)
*F01D 1/16* (2006.01)
*F01D 9/04* (2006.01)
*F01D 9/00* (2006.01)
*F04D 21/00* (2006.01)
*F02C 7/00* (2006.01)
*F02C 3/00* (2006.01)
*F02C 3/06* (2006.01)
*F02C 3/14* (2006.01)

(56) References Cited

U.S. PATENT DOCUMENTS

| | | | | |
|---|---|---|---|---|
| 2,989,843 A | * | 6/1961 | Ferri | 60/226.1 |
| 3,062,484 A | * | 11/1962 | Himka | 244/53 |
| 4,707,978 A | * | 11/1987 | Garcia Cascajosa | 60/39.35 |
| 8,359,825 B2 | * | 1/2013 | Alvi | 60/204 |
| 2013/0142632 A1 | * | 6/2013 | Roberts, II et al. | 415/181 |
| 2013/0164120 A1 | * | 6/2013 | Saretto et al. | 415/181 |
| 2013/0164121 A1 | * | 6/2013 | Roberts, II et al. | 415/181 |

* cited by examiner

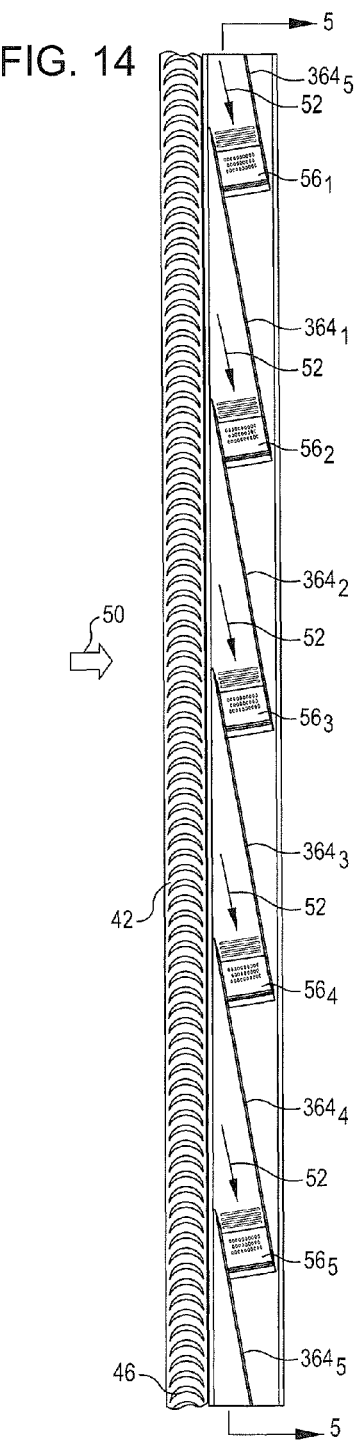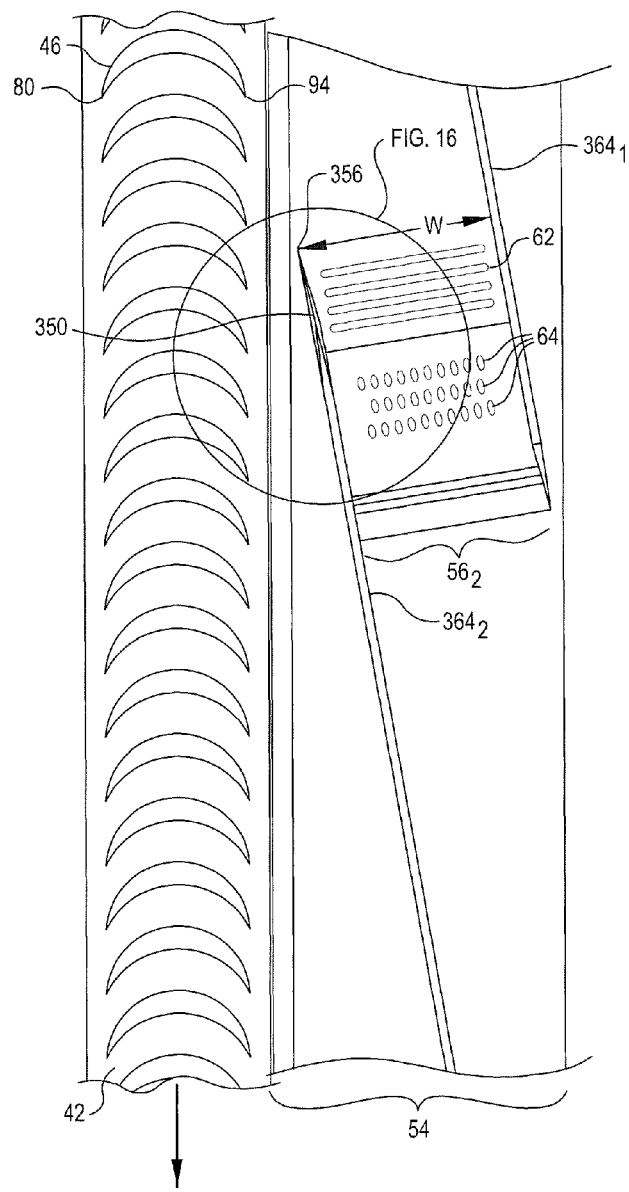

GAS TURBINE ENGINE WITH SUPERSONIC COMPRESSOR

STATEMENT OF GOVERNMENT INTEREST

This invention was made with United States Government support under Contract No. DE-FE0000493 awarded by the United States Department of Energy. The United States Government has certain rights in the invention.

CROSS-REFERENCE TO RELATED APPLICATIONS

This application cross-references co-pending U.S. Provisional Patent Applications, each of which was filed on Jul. 9, 2011, as U.S. Provisional Patent Application Ser. No. 61/506,055, for a SUPERSONIC COMPRESSOR, and U.S. Provisional Patent Application Ser. No. 61/506,064, for a GAS TURBINE ENGINE WITH SUPERSONIC COMPRESSOR, and U.S. Provisional Patent Application Ser. No. 61/506,073, for a GAS TURBINE ENGINE, each of which co-pending U.S. applications are incorporated herein in their entirety by this reference.

COPYRIGHT RIGHTS IN THE DRAWING

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This description relates to gas turbine engines, and more particularly to gas turbine engines which include gas compression sections which are designed to utilize supersonic shock compression.

BACKGROUND

A continuing interest exists in industry for improved gas turbine engines. Gas turbine engines continue to be useful in a wide variety of applications. Operational costs could be substantially improved in many applications by adoption of an improved gas turbine engine that would increase operating efficiency as compared to currently-utilized gas turbine designs. Further, from the point of view of maintenance costs, it would be desirable to develop improved gas turbine engine designs that would reduce the mass of rotating components, since such rotating components are costly when replacement or repair becomes necessary, as compared to non-rotating parts, which although subject to stress and strain from temperature and pressure, are not subject to additional loads due to rotary motion. Thus, it can be appreciated that it would be advantageous to provide a new, high-efficiency gas turbine engine design which minimizes moving parts. Generally, it would be advantageous to provide more horsepower with less weight. And more specifically, it would be advantageous to provide small gas turbines having a relatively high overall efficiency, particularly in the one-half to three megawatt range A key component of gas turbine engines is the compressor section. Although supersonic compressors have been contemplated for use in gas turbine engines, there remain various technical problems in the field and with respect to which better solutions are required in order to improve operational capability and compression efficiency. In particular, although relatively low pressure ratio supersonic compressors have been proposed for gas turbine engines, there still remains a need for compressors for gas turbine engines that can be easily started, yet be operated at high compression ratios. Further, it would be advantageous to avoid configurations that present moving shocks, such as between moving blades, between moving and fixed blades, or between moving and fixed walls, in order to more simply achieve stability for a normal shock at a selected location in the compressor section of a gas turbine engine.

In short, there remains a need to provide a design for a gas turbine engine with a high pressure ratio supersonic compressor that simultaneously resolves various practical problems, including (a) providing for starting of a compressor designed for high pressure ratio operation, so as to enable control of a normal shock at an effective location in a supersonic diffuser when configured as a stator and designed for high pressure ratio and efficient compression, (b) avoiding excessive numbers of leading edge structures (such as may be encountered in prior art multi-bladed stators), and minimizing other losses encountered by a high velocity supersonic gas stream upon entering a stator, and (c) providing for effective boundary layer control, especially as related to retention of a normal shock at a desirable location, in order to achieve high compression ratios in an efficient manner.

SUMMARY

A novel gas turbine engine has been developed that, in an embodiment, utilizes a supersonic compressor that may be provided in a compact footprint, and in which the total mass (and therefore the number) of rotating parts has been minimized. In an embodiment, the compact design may reduce bearing span, which may be a significant advantage in first cost and/or maintenance costs. In an embodiment, the compressor of the gas turbine utilizes impulse blades on a rotor to develop gas velocity in an incoming gas stream, to accelerate the incoming gas stream tangentially and axially, and to deliver gas flow at supersonic flow conditions to a stator. The stator is a diffuser that includes a plurality of stationary aerodynamic ducts that utilize shock wave generating compression ramps for decelerating incoming gas. An expansion ramp is utilized to diffuse the incoming gas and recover pressure. In an embodiment, a design utilizes aerodynamic ducts which minimizes the total number of leading edges, and which minimizes the length of leading edges exposed to an incoming flow of gas at supersonic conditions. In an embodiment, the aerodynamic ducts may be wrapped about a surface of revolution that extends along a longitudinal axis, for example, a selected cylindrical shape or selected partial conical shape. In various embodiments, aerodynamic ducts may be provided in helical, helicoidal, or spiral configurations. In an embodiment, aerodynamic ducts may be provided in a shape having a relatively constant helical angle. In an embodiment, aerodynamic ducts may be provided along a centerline in the configuration of a general helix, in that the ratio of curvature to torsion is constant. Alternately, aerodynamic ducts may be provided in a conical helix configuration, in the form of a slight spiral as if located over an underlying conic surface. In various embodiments, aerodynamic ducts may be either right-handed or left-handed. In an embodiment, entrance throats of the aerodynamic ducts may be oriented substantially in concert with the direction of high velocity supersonic gas leaving an impulse rotor, directed toward the stator. A series of oblique shocks and a normal shock may be utilized within aerodynamic ducts to efficiently transform the high-velocity, incoming gas flow to a high-pressure, subsonic gas flow. Subsequent to a stator, the high pressure gas is directed to a combustor. After the combustor, the resultant hot combustion gases are expanded through one or more turbine stages for recovery of shaft power. In an embodiment, the one or more turbine stages may be provided by axial gas turbines.

For starting supersonic shocks in a compressor for a gas turbine engine, a stator may include bypass gas outlets for removal of a portion of the incoming gas flow to an extent that facilitates the establishment of supersonic shocks within the stator, consistent with a design point for a selected compression ratio, inlet Mach number, and mass flow of a selected gas. In an embodiment, the bypass gas outlets may be utilized for recycle of a portion of incoming gas. In an embodiment, particularly for the gas turbine applications involving compression of ambient air, the bypass gas may be simply discharged to the atmosphere. Or, an adjustable internal bypass passageway may be provided, for example using doors that are actuated to an open position during startup but which remain closed during normal operation, to allow a portion of incoming gas to escape downstream of the throat of the aerodynamic duct while remaining within an aerodynamic duct. In an embodiment, the gas compressor may provide geometrically adjustable portions in aerodynamic ducts, to change the quantity of incoming gas flow area through the stator, in order to start and establish stable supersonic shock operation. In an embodiment, both starting bypass gas outlets and geometrically adjustable portions may be utilized.

For minimization of adverse aerodynamic effects, and for improving efficiency of gas flow through a stator, one or more boundary layer control structures may be utilized. Such boundary layer control structures may be selected from one or more types of boundary layer control techniques, including removal of a portion of gas flow via boundary layer extraction or bleed, or by energizing a boundary layer by boundary layer gas injection, or by energizing a boundary layer by mixing, such as by use of vortex generators. In an embodiment, the vortex generators may generate multiple vortices, wherein a larger vortex rotates a simultaneously generated, adjacent, and smaller vortex toward and thence into a boundary layer, and thus controls such boundary layer as the smaller vortex mixes with the boundary layer.

In an embodiment, the compressor of a gas turbine engine as described herein may have multiple gas paths, that is, multiple aerodynamic ducts, for generating supersonic shock waves and for allowing subsonic diffusion downstream of a throat portion. Since, in an embodiment, supersonic shocks may be located within stationary structures, such as along a stationary ramp portion of an aerodynamic duct, the control of shock location is greatly simplified, as compared to various prior art supersonic compressor designs where shocks are located between structures within rotors, or between adjacent rotors, or between rotors and adjacent stationary structures such as circumferential walls.

Further, the location of shocks within stator, i.e. stationary diffuser, avoids parasitic losses that are present in prior art designs due to drag resulting from the rotational movement of various rotor components. More fundamentally, an embodiment of the gas turbine compressor design disclosed herein develops high compression ratios with very few aerodynamic leading edge structures, particularly stationary structures, protruding into the supersonic flow path. In part, such improvement is achieved because a design is provided in which the number of aerodynamic ducts is minimized. In an embodiment, only a single leading edge is provided per aerodynamic duct, and thus the number of leading edge surfaces interposed into a supersonic flow stream is minimized. Consequently, the compressor design(s) disclosed herein have the potential to provide highly-efficient gas turbines, especially when such compressors operate at high compression ratios in a single compression stage. For example, and without limitation, the gas turbine compressor designs disclosed herein may utilize compressors operating at compression ratios in a single stage of up to about four to one (4:1), or at least about four to one (4:1), or at least about six to one (6:1), or from between about six to one to about ten to one (about 6:1 to about 10:1), or up to about twelve and one-half to one (12.5:1), or up to about twenty to one (20:1), or higher.

Finally, many variations in gas flow configurations, particularly in detailed rotor blade geometry and in detailed stator geometry, may be made by those skilled in the art and to whom this specification is directed, without departing from the teachings hereof.

BRIEF DESCRIPTION OF THE DRAWINGS

Novel gas turbine engine designs will be described by way of exemplary embodiments, using for illustration the accompanying drawing figures in which like reference numerals denote like elements, and in which:

FIG. 2 also shows an embodiment for a stator in which the throat of the aerodynamic duct is in close alignment with the direction of gas flow leaving the rotor blades.

FIG. 14 provides a circumferential view of an exemplary gas flow path into an impulse bladed rotor and thence through a stator having leading edges followed by a plurality of aerodynamic ducts each having a converging portion provided via a compression ramp and a diverging portion illustrated by expansion ramps, and showing bypass bleed passageways for starting, and boundary layer outlet bleed ports to assist in boundary layer control, for shock stability, and for efficiency.

FIG. 15 is an enlargement of a portion of the circumferential view just provided in FIG. 14, now showing a leading edge of an aerodynamic duct in a stator, and also showing a converging portion provided via a compression ramp and diverging portion illustrated by an expansion ramp, and showing starting bleed ports and boundary layer ports.

Figure 1:
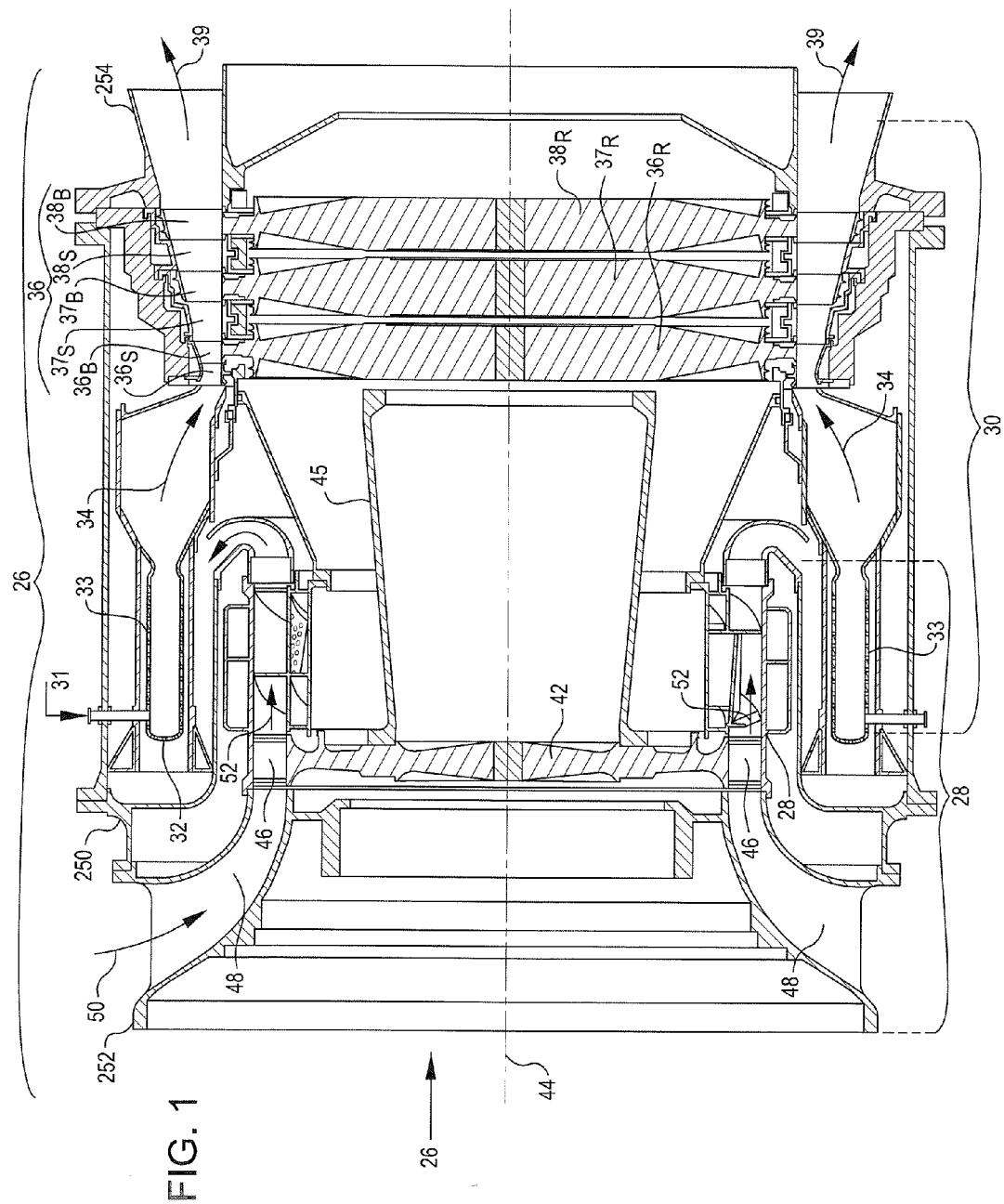
FIG. 1 is a cross-sectional view of an exemplary compact gas turbine engine design provided utilizing a supersonic compressor design as provided herein.

The foregoing figures, being merely exemplary, contain various elements that may be present or omitted from actual gas turbine engine designs, and in particular, for such gas turbine engines utilizing supersonic compressor designs according to the principles taught herein. Other designs may use slightly different aerodynamic structures, mechanical arrangements, or process flow configurations, and yet employ the principles described herein or depicted in the drawing figures provided. An attempt has been made to draw the figures in a way that illustrates at least those elements that are significant for an understanding of an exemplary gas turbine engine utilizing a supersonic compressor. Such details should be useful for providing an efficient gas turbine engine design for use in industrial systems.

It should be understood that various features may be utilized in accord with the teachings hereof, as may be useful in different embodiments as necessary or useful for various gas turbine engine applications, depending upon the conditions of service, such as temperatures and pressures of gas being processed, within the scope and coverage of the teaching herein as defined by the claims.

DETAILED DESCRIPTION

The following detailed description, and the accompanying figures of the drawing to which it refers, are provided describing and illustrating some examples and specific embodiments of various aspects of the novel gas turbine engines set forth herein, and are not for the purpose of exhaustively describing all possible embodiments and examples of various aspects of the such gas turbine engines as described and claimed below. Thus, this detailed description does not and should not be construed in any way to limit the scope of the gas turbine engines claimed in this document.

To facilitate the understanding of the subject matter disclosed herein, a number of terms, abbreviations or other shorthand nomenclature are used as set forth herein below. Such definitions are intended only to complement the usage common to those of skill in the art. Any term, abbreviation, or shorthand nomenclature not otherwise defined shall be understood to have the ordinary meaning as used by those skilled artisans contemporaneous with the first filing of this document.

In this disclosure, the term "aerodynamic" should be understood to include not only the handling of air, but also the handling of other gases within the compression and related equipment otherwise described. Thus, more broadly, the term "aerodynamic" should be considered herein to include gas dynamic principles for gases other than air. For example, although ambient air may be compressed using the compressor section of the apparatus described, certain gas turbine engine applications exist for other gaseous mixtures, some including certain gaseous fuel components, and/or containing other oxidants, and thus as applicable the term "aerodynamic duct" shall also include the compression of gases or gas mixtures other than ambient air, in what may be considered a gas dynamic duct.

The term stator" or "stationary diffuser" may be used to describe an apparatus designed to reduce the velocity and increase the pressure of a gas entering at supersonic velocity. A stator or stationary diffuser may employ one or more aerodynamic ducts, which, when multiple aerodynamic ducts are used, divide the incoming gas into smaller flows for processing. Such aerodynamic ducts may include (a) a supersonic portion, which may be in the form of a converging portion generally of decreasing cross-sectional area and which receives gas at supersonic velocity and creates oblique shocks, (b) a throat portion, at or in which in a minimal throat cross-sectional area is provided, and (c) a subsonic portion, which may be in the form of a diverging portion of increasing cross-section toward a final cross-sectional area and which allows kinetic energy from gas velocity to be converted into static pressure of the gas.

The term "impulse blade(s)" may be used to describe blades used to accelerate the flow of gas having a characteristic geometry wherein kinetic energy is imparted to the gas passing therethrough, and at a theoretical limit, no pressure increase is imparted to the gas passing therethrough. Thus, in impulse blades as described herein, the work done on a gas flow by impulse blades results predominantly in an increase in velocity, rather than predominantly in an increase in pressure. The velocity increase of a gas flow through impulse blades is achieved by change of direction of the gas flow.

The term "inlet" may be used herein to define an opening designed for receiving fluid flow, and more specifically, the flow of gas. For example, in an aerodynamic duct for a stator in a compressor section of a gas turbine, the aerodynamic duct has an inlet having an inlet cross-sectional area that is shaped to capture and ingest gas to be compressed. Inlets may have a large variety of shapes, and a few exemplary shapes are provided herein.

The term "startup" may be used to define the process of initiating gas flow in aerodynamic ducts, and achieving stable supersonic flow of gas through a converging portion, and into at least some of a diverging portion of generally increasing cross-sectional area extending downstream from a throat of an aerodynamic duct. More specifically, startup is the achievement of a condition wherein shock waves defining the boundary between supersonic and subsonic conditions of gas flow are stabilized at a desired location in an aerodynamic duct, given the mass flow, inlet Mach number, and pressure ratio for a selected gas composition being compressed. In general, various structures and/or systems as described herein may be used for startup, in order to conduct the process of initiating operation and establishing a stable shock system in aerodynamic ducts. In various embodiments, geometrically adjustable portions may be provided, allowing for a shock to be swallowed through a throat in an aerodynamic duct, to thereby start the aerodynamic duct. In other embodiments, aerodynamic ducts may be configured to allow external discharge of a portion of the gas flow thereto, in order to provide for startup, again by allowing a shock to be swallowed through a throat in an aerodynamic duct. In other embodiments, aerodynamic ducts may be configured to allow a portion of the gas flow thereto to internally bypass the throat and return to the aerodynamic duct downstream of the throat. Such gas flow may be reintroduced into a diverging portion of an aerodynamic duct. In an embodiment, reduced gas flow through the throat of an aerodynamic duct allows for starting of the aerodynamic duct. In other embodiments, increased gas flow through an aerodynamic duct, such as by way of a door to temporarily enlarge the effective cross-sectional area at a throat, may allow for starting of the aerodynamic duct. The performance of the aerodynamic ducts when in a startup configuration would be roughly the same as might be found in an aerodynamic duct without adjustable gas flow and having the same effective contraction ratio (in other words, the degree of blockage of the aerodynamic duct) for example, as in a fixed geometry aerodynamic duct. However, once startup is achieved and stable supersonic flow is established, bypass valves, gates, doors, or other structures employed to provide for bypass of some gas around the converging portion, or to provide increased throat cross-sectional area, may be closed or returned to an operating position or operating condition. Thereafter, in an operational configuration, a gas turbine compressor section as described herein provides aerodynamic ducts wherein a high pressure ratio recovery is achieved even when a single stage of compression is employed.

The term "un-start condition" may be used herein to describe a flow condition under which gas to be compressed flows through an inlet much less effectively than under compressor design conditions, and wherein some, or even most of entering gas may be rejected from the inlet, instead of being properly ingested for effective operation of the compressor. In various embodiments, during an un-start condition, supersonic flow conditions with stable shocks would not be properly established at their design range locations within an aerodynamic duct.

Figure 7:
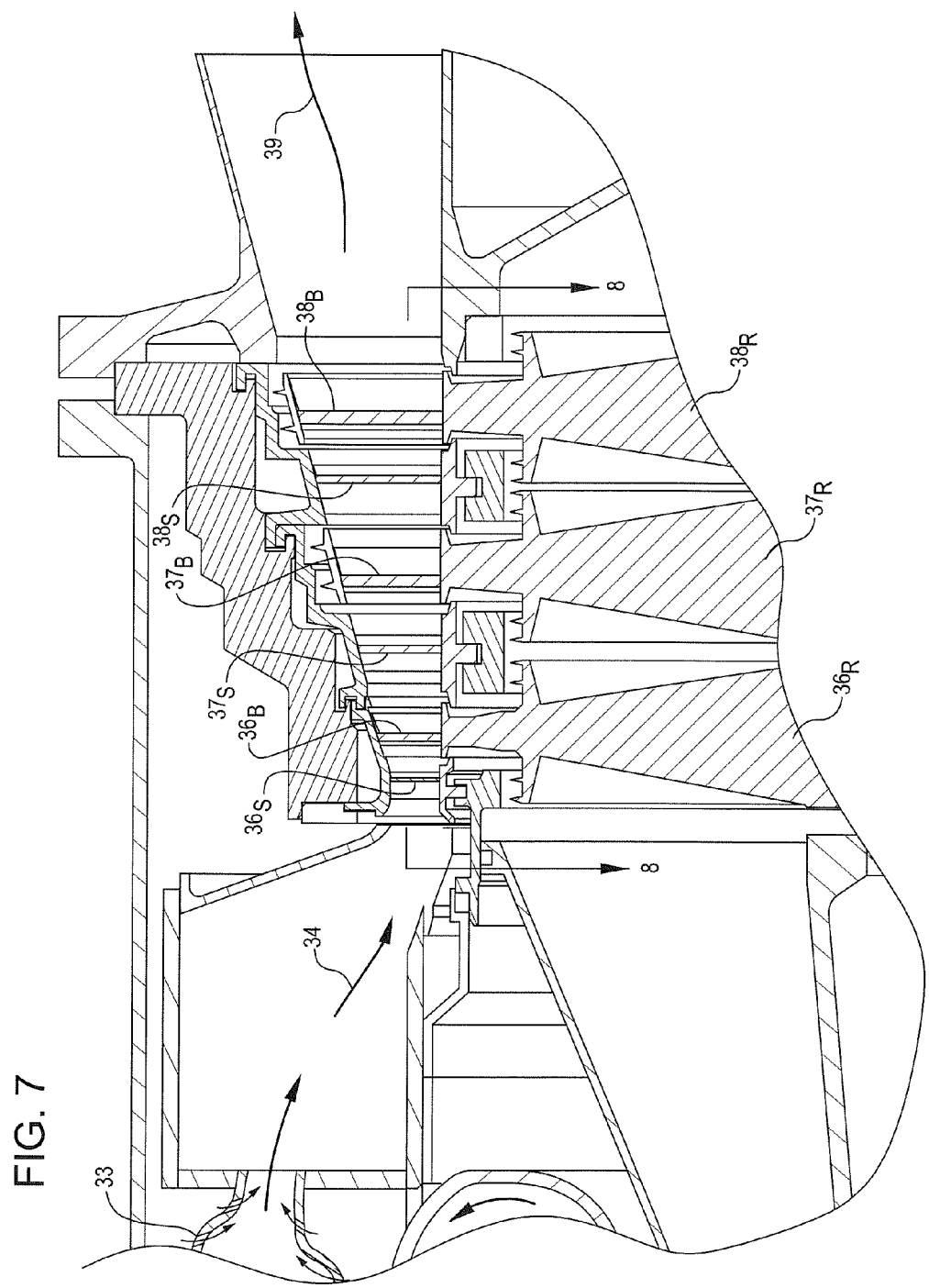
FIG. 7 is a partial cross-sectional view of an exemplary gas turbine engine, showing hot combustion gases exiting a burner and travelling to, and thence through, a plurality of turbine stages.
Figure 8:
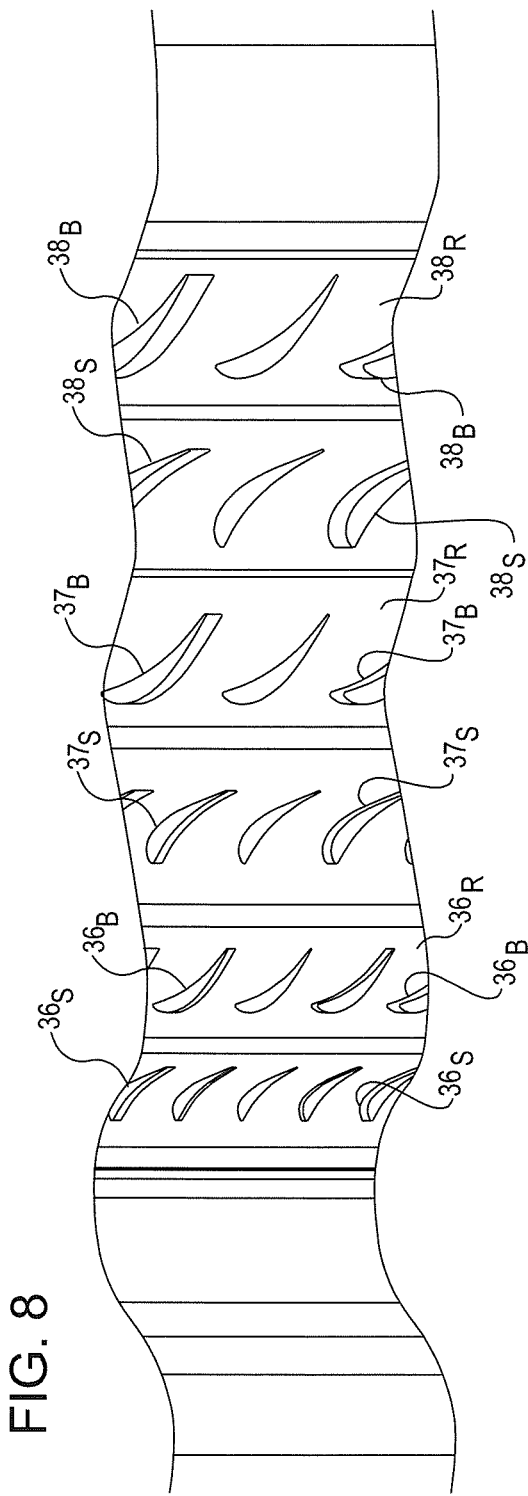
FIG. 8 is a cross-sectional view taken through line 8-8 of FIG. 7, showing rotor blades and stator blades in the turbine section of the gas turbine engine.

Attention is directed to FIG. 1, which illustrates a cross-sectional view for a compact gas turbine engine 26. The gas turbine engine 26 may utilize a supersonic compressor section 28, and a gas turbine section 30, including a combustor 32, which may include one or more burners 33, such as can-annular burners, to burn fuel 31 provided thereto from a fuel supply (not shown) and to produce, as products of combustion, hot pressurized exhaust gases 34. The hot pressurized exhaust gases 34 are then directed to, for passage therethrough, the gas turbine 36, to produce shaft power. A portion of the power produced may be transmitted to the compressor section 28 via a shaft 45, for compression of an incoming selected oxidant-containing gas such as ambient air. The gas turbine section 30 may include one or more gas turbines, and as such may include gas turbine rotors $36_R$, $37_R$, and $38_R$ with rotor blades $36_B$, $37_B$, and $38_B$, and adjacent stator blades $36_S$, $37_S$, and $38_S$, respectively (see FIG. 7 for details), for expansion of hot products of combustion, that is combustion gases 34, to extract shaft power and to produce an exhaust gas 39. In an embodiment, a supersonic compressor section 28 may utilize a rotor 42 having an axis of rotation 44 and driving shaft 45, and have a plurality of blades 46 extending into a gas flow inlet passageway 48. Blades 46 may be sized and shaped to act on a selected incoming gas 50, such as air or a selected oxidant-containing gas, to provide a supersonic gas flow 52.

Figure 2:
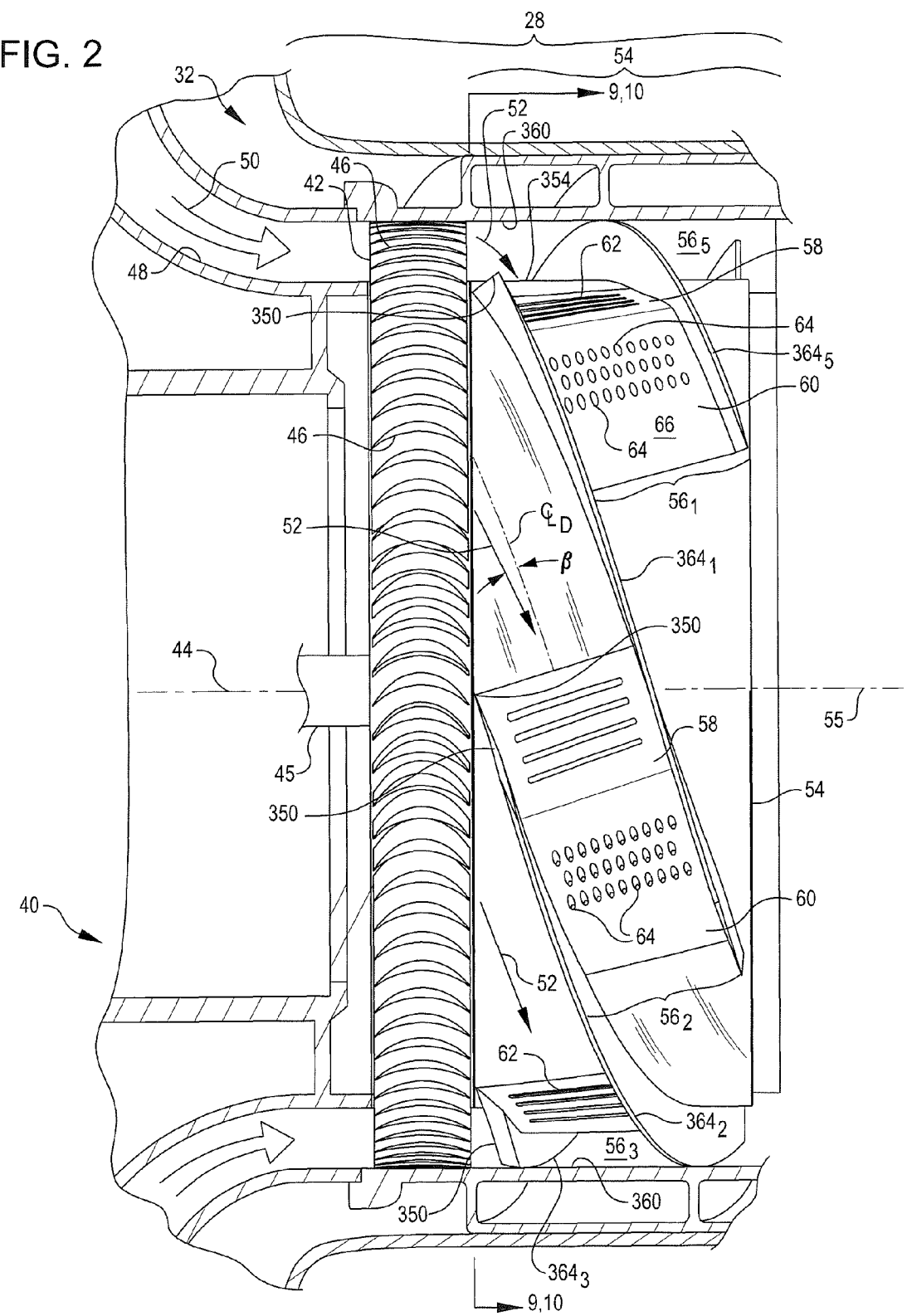
FIG. 2 is a partially cut-away vertical view, showing, in cross-section, an inlet passageway feeding a gas supply to impulse blades on a rotor (shown from the side to reveal exposed blades). The impulse blades deliver gas at supersonic conditions to a stator, i.e. stationary diffuser, having a plurality of aerodynamic ducts. The aerodynamic ducts include converging and diverging portions, inlet bypass gas passageways for starting, and boundary layer outlet bleed ports for boundary layer control.

Turning now to FIG. 2, for a supersonic compressor section 28, a stator 54 may be provided. In an embodiment, stator 54 may be disposed around a longitudinal axis 55 (shown with centerline $C_L$ in FIG. 2) and positioned to receive the supersonic gas flow 52. In an embodiment, the stator 54 may be provided with a plurality of aerodynamic ducts 56. In the various figures of the drawing, the one or more aerodynamic ducts 56 may be individually further identified with a subscript as a first aerodynamic duct $56_1$, a second aerodynamic duct $56_2$, a third aerodynamic duct $56_3$, a fourth aerodynamic duct $56_4$, a fifth aerodynamic duct $56_5$, a sixth aerodynamic duct $56_6$, and seventh aerodynamic duct $56_7$, and the like for each individual aerodynamic ducts 56 that may be utilized in a specific stator 54 design. Aerodynamic ducts 56 may include converging portions 58 and diverging portions 60. In an embodiment, rotor 42 may be configured to turn incoming gas 50 to provide a supersonic relative velocity gas flow 52 at a selected gas rotor exit angle beta ($\beta$) relative to the centerline $C_{LD}$ of the one or more downstream aerodynamic ducts 56. In an embodiment, the angle beta ($\beta$) may be provided at zero degrees (0°) and thus a unique incidence angle is provided between the direction of the gas flow 52 and the centerline $C_{LD}$ of the one or more downstream aerodynamic ducts 56. Further, a rotor 42 and a stator 54 together, as depicted in FIG. 2, provide a stage of compression, and thus in those cases where further compression is required, multiple stages of compression may be utilized in order to provide gas at a desired final pressure, before combustion.

In an embodiment, a stator 54 may include therein one or more structures that enable startup, and one or more structures that provide for control of boundary layer drag, as more fully addressed below. In an embodiment, bypass gas passageways 62 as noted in FIG. 2 may be provided to remove a portion of incoming gas 52 during startup conditions, so as to adjust the effective contraction ratio of the associated aerodynamic duct 56. In this manner, aerodynamic ducts 56 may be designed for operation at high compression ratios, yet be adapted for startup of a stable supersonic shock system within the aerodynamic duct 56 that ultimately enables high compression ratio operation.

In an embodiment, aerodynamic ducts 56 may include one or more boundary layer control structures, such as outlet ports 64 as seen in FIG. 2 for removal of gas from aerodynamic ducts 56 as may be required for control of boundary layer at surface 66 of the aerodynamic duct 56. As further described below, boundary layer control may be provided by one or more other or additional structures, such as via vortex generators 72 or 74 (see, for example, FIGS. 20).

Returning to FIG. 2, compressor section 28 may utilize a compressor 40 having a rotor 42 having an axis of rotation 44, and, for example a driving shaft 45, and a plurality of blades 46 extending into a gas flow passage 48. Blades 46 may be sized and shaped to act on a selected incoming gas 50 to provide a supersonic gas flow 52. A diffuser configured as stator 54 is provided. In an embodiment, stator 54 may be disposed around a longitudinal axis 55 (shown with centerline $C_{LD}$ in FIG. 2) and positioned to receive the supersonic gas flow 52. In an embodiment, the stator 54 may be provided as one or more aerodynamic ducts 56. In some of the figures (see FIGS. 9, 10, and 14, for example), the one or more aerodynamic ducts 56 may be individually further identified with a subscript as a first aerodynamic duct $56_1$, a second aerodynamic duct $56_2$, a third aerodynamic duct $56_3$, a fourth aerodynamic duct $56_4$, a fifth aerodynamic duct $56_5$, and in FIG. 10, a sixth aerodynamic duct $56_6$, and seventh aerodynamic duct $56_7$, are shown for each individual aerodynamic duct 56 that may be utilized in a specific stator 54 design. More generally, a number N of aerodynamic ducts 56 and a number B of blades 46 may be provided, with the number B of blades 46 and the number N of aerodynamic ducts 56 being unequal, in order to avoid adverse harmonic effects. In other words, the selected design should avoid harmonic interference between the plurality of blades and the aerodynamic ducts. While in various prior art compressor designs a number B of blades 46 of N minus 1 (N−1) or of N plus one (N+1) has generally been considered acceptable to avoid adverse harmonic effects, it is noted herein that aerodynamic losses are reduced by minimizing the number of aerodynamic ducts 56, and more specifically, by reducing the number of components exposed to a supersonic incoming gas stream. Thus, in an embodiment, the number of blades 46 may considerably exceed the number of aerodynamic ducts 56, thereby reducing components exposed to supersonic flow. However any ratio between the number B of blades 46 and the number N of aerodynamic ducts 56 should be selected to avoid adverse harmonic effects.

The aerodynamic ducts 56 each include a converging portion 58 and a diverging portion 60. In an embodiment, rotor 42 may be configured with blades 46 to turn incoming gas 50 to provide a supersonic relative velocity gas flow 52 at a selected gas rotor exit angle beta ($\beta$) relative to the centerline $C_{LD}$ of the one or more downstream aerodynamic ducts 56. In an embodiment, but without limitation, the angle beta ($\beta$) may be provided at zero degrees (0°), wherein the direction of gas flow 52 is aligned with the centerline $C_{LD}$ of aerodynamic ducts 56, and thus a unique incidence angle is provided between the direction of the gas flow 52 and the centerline $C_{LD}$ of the one or more downstream aerodynamic ducts 56. In other words, in an embodiment, a unique incidence angle is provided since the direction of gas flow 52 matches the centerline $C_{LD}$ of an aerodynamic duct 56 into which the gas flow 52 occurs. However, it should be understood that configurations which are not so precisely aligned may also be workable, but it should be noted that if the flow angle beta ($\beta$) is not aligned with respect to the aerodynamic ducts 56, a series of shock waves or expansion fans (depending on whether the relative angle of attack of the incoming flow is positive or negative) will be formed to turn the flow to largely match the flow angle through the aerodynamic ducts 56 along centerline $C_{LD}$. Such shock wave or expansion fan systems will result in total pressure loss which will contribute to a decrease in overall compression efficiency, and reduce the overall compressor ratio achieved for a given speed of blades 46. As an example, a variation in flow incidence angle beta ($\beta$) ranging from about 11.0 to about 8.0 degrees, at inflow Mach numbers of from about 2.0 to about 3.0, respectively, would result in about three (3) percentage points of efficiency loss. Such increased losses and corresponding decreases in stage efficiency may be acceptable in various applications. However, in addition to shock wave or expansion fan conditions resulting in pressure and efficiency loss, adverse shock wave to boundary layer interaction, and or boundary layer separation issues, may arise as such off-design conditions become more severe, depending upon the strength of the shock wave system and the thickness of the boundary layer system interacting therewith. And, adverse shock wave and accompanying pressure signatures may be expected to reflect from blades 46, especially at the trailing edges thereof, potentially increasing stress and reducing life of blades 46. Consequently, embodiments tending to closely align incoming flow angle beta ($\beta$) with the centerline $C_{LD}$ of aerodynamic ducts 56 should be considered optimal, although not limiting.

A rotor 42 and a stator 54 together, as depicted in FIG. 2, provide a stage of compression. In those cases where further compression is required, multiple stages of compression may be utilized in order to provide gas at a desired final pressure.

As shown in FIG. 2, in an embodiment, a stator 54 may include therein one or more structures that enable startup of the shock wave, and one or more structures that provide for control of boundary layer drag, as more fully addressed below. In an embodiment, bypass gas passageways 62 may be provided to remove a portion of incoming gas 52 during startup conditions, so as to adjust the effective contraction ratio of the associated aerodynamic duct 56. In this manner, aerodynamic ducts 56 may be designed for operation at high compression ratios, yet be adapted for startup of a stable supersonic shock system within the aerodynamic duct 56 that ultimately enables transition to high compression ratio operation.

In an embodiment, aerodynamic ducts 56 may include one or more boundary layer control structures, such as bleed ports 64 as seen in FIG. 2 for removal of gas from aerodynamic ducts 56 as may be required for control of boundary layer at surface 66 of the aerodynamic duct 56. As further described below, boundary layer control may be provided by one or more other or additional structures.

Figure 3:
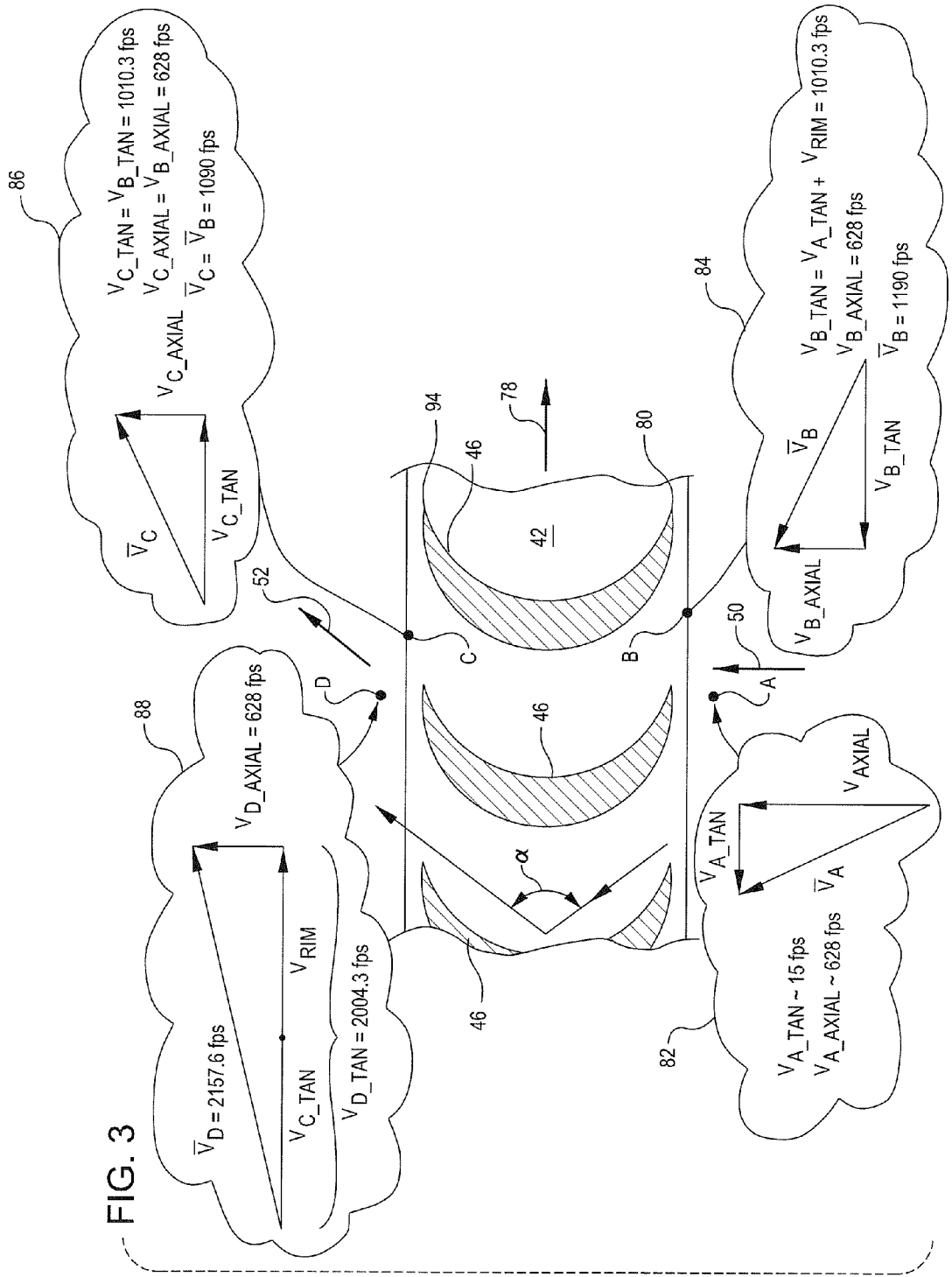
FIG. 3 provides a gas velocity diagram with respect to an exemplary impulse rotor blade design, describing gas velocity components at four different locations relative to blades extending from a rotor.

Turning now to FIG. 3, as an example for a particular design and without limitation, flow conditions are depicted for an embodiment for a design within a selected design envelope for a supersonic compressor for use in a gas turbine engine. The rotor 42 includes impulse blades 46, moving in the direction indicated by reference arrow 78. The use of an impulse rotor 42 enables efficient turning of the flow of an incoming gas, especially when utilizing a rotor 42 with sharp leading edges 80 and sharp trailing edges 94. At location A, upstream of rotor 42, a small tangential velocity (as compared to tangential velocity after exit from rotor 42 as described below) may be encountered prior to the rotor 42, as indicated by the velocity diagram shown in cloud 82. Upon entry to the rotor 42, gas velocity at location B is accelerated as indicated in the velocity diagram shown in cloud 84. Just prior to leaving the rotor 42 at location C, the gas has been partially accelerated and is moving as indicated in the velocity diagram shown in cloud 86. Finally, after exit from rotor 42, at location D, the gas velocity is as indicated in the velocity diagram shown in cloud 88. Basically, an impulse bladed rotor 42 allows a high degree of turning of the incoming gas 50, through an angle alpha ($\alpha$). Moreover, as seen in the velocity vector diagram set forth in cloud 88, the vector sum of the axial velocity at location D (VD_Axial of about 628 feet per second), the tangential velocity at location D (VD_Tangential of about 2004.3 feet per second), provides an overall relative velocity of gas stream 52 at location D (VD of about 2157.6 feet per second), which is thus supersonic for gas stream 52 as it enters an aerodynamic duct 56 of stator 54. Thus, in an embodiment, the desired supersonic velocity of gas stream 52 entering the aerodynamic ducts 56 of stator 54 is achieved by a combination of velocity of gas through the blades 46 and the tangential rotation of the rotor 42.

In an embodiment for a supersonic compressor 40 such as illustrated in FIG. 3, the selected inlet gas passing through the blades 46 of the rotor 42 may be turned by an angle alpha ($\alpha$) of at least ninety (90) degrees. In an embodiment of compressor 40, the selected inlet gas passing through the rotor 42 may be turned by an angle alpha ($\alpha$) of at least one hundred (100) degrees. In an embodiment of compressor 40, the selected inlet gas passing through the blades 46 of the rotor 42 may be turned by an angle alpha ($\alpha$) of at least one hundred ten (110) degrees. In an embodiment of compressor 40, the selected inlet gas passing through the blades 46 of the rotor 42 may be turned by an angle alpha ($\alpha$). The angle alpha ($\alpha$) may be at least ninety (90) degrees, for example, between about ninety (90) degrees and about one hundred twenty five (125) degrees, or between about ninety (90) degrees and about one hundred sixty (160) degrees, or between about one hundred twelve (112) degrees and about one hundred fourteen (114) degrees. Details of exemplary designs for various impulse type blades for use in supersonic compressors may be found by those of skill in the art from various sources. One helpful reference may include a NASA report entitled "Analytical Investigation of Supersonic Turbomachinery Blading—Section II—Analysis of Impulse Turbine Blade Sections", by Louis J. Goldman, Published as Report No. NASA-TN-D-4422, on Apr. 1, 1968, which is incorporated herein by reference, and to which the reader may refer for additional background in implementing an impulse blade in a supersonic compressor design as further taught herein.

Figure 4:
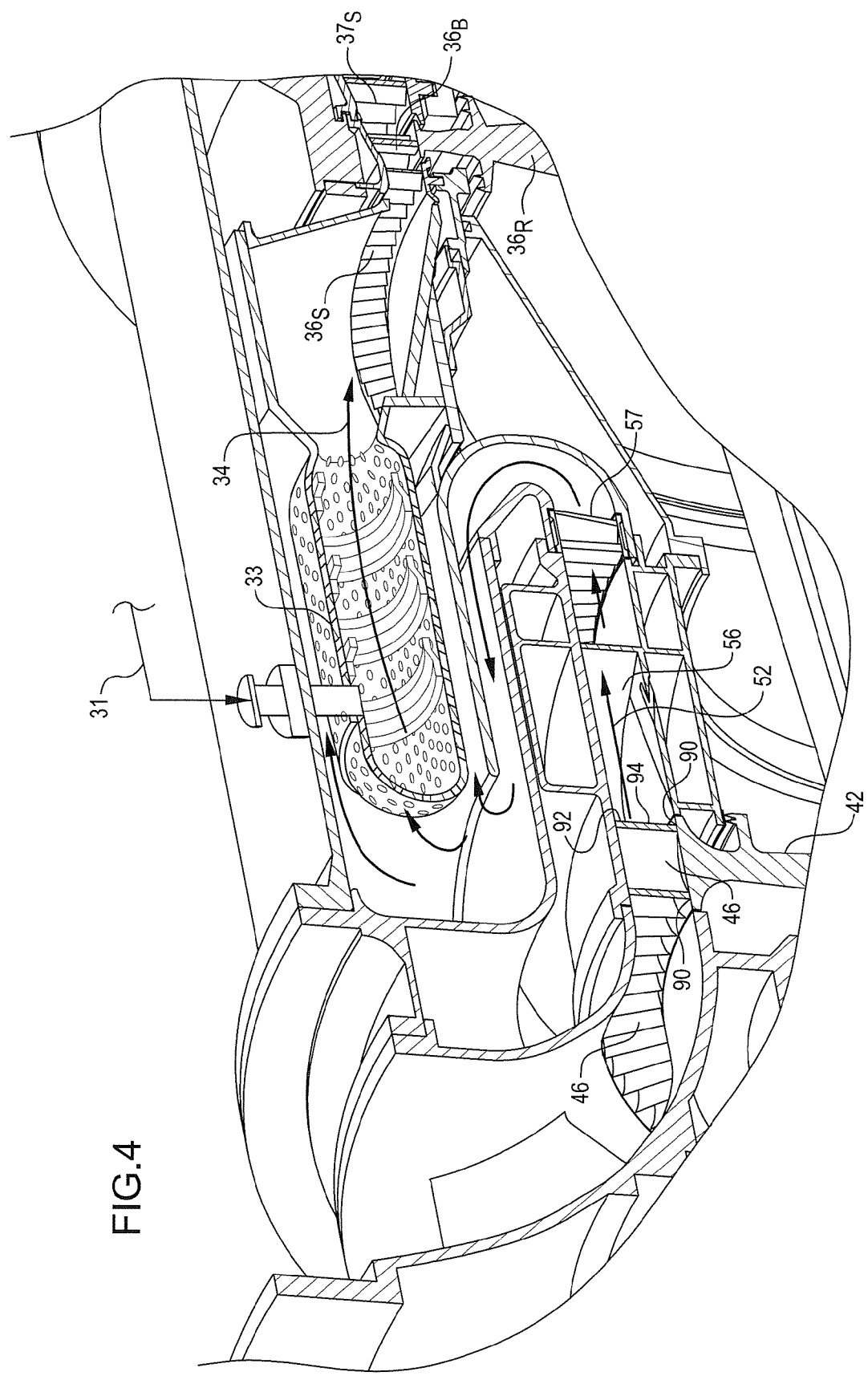
FIG. 4 is a partial cross-sectional view of the gas turbine engine set forth in FIG. 1, now showing in more detail the impulse blades on a rotor and a downstream stator that includes a plurality of aerodynamic ducts, showing a helical structure for the aerodynamic ducts having converging and diverging portions, turning vanes to redirect the flow for supply to burners, which may in an embodiment be provided as can-annular type burners, and showing a downstream gas turbine rotor and blades.

As shown in FIG. 4, in an embodiment, each of the plurality blades 46 in rotor 42 may have a hub end 90, a tip end 92, and a trailing edge 94. In an embodiment, the blades 46 may be provided with supersonic gas flow 52 at their trailing edge 94. In an embodiment, supersonic gas flow 52 at the trailing edge 94 may be from the hub end 90 to the tip end 92 of the trailing edge 94.

Figure 19:
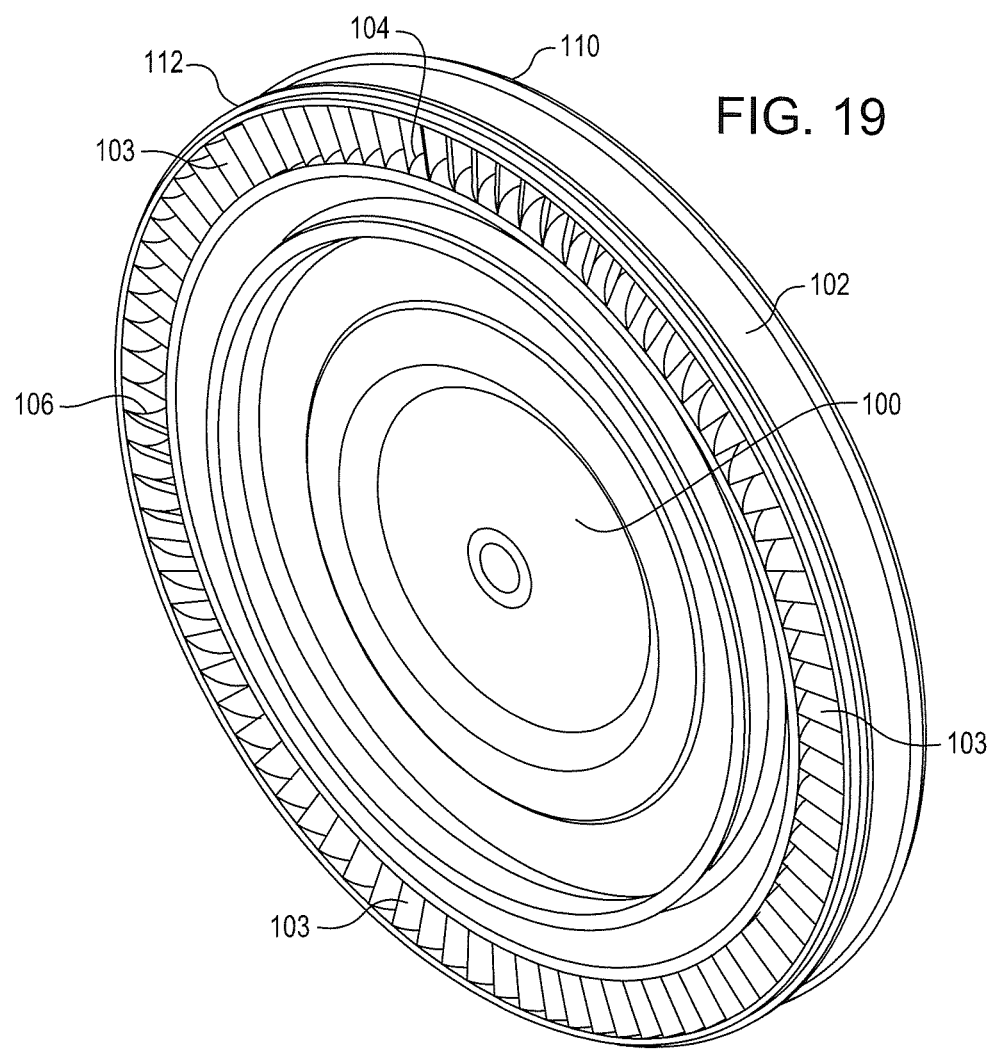
FIG. 19 is a perspective view of an embodiment for an impulse rotor, similar to that seen in FIG. 2 above, but now showing the use of an impulse rotor having a shroud for the blades, and in this embodiment, also showing teeth for a labyrinth-type seal structure on the circumferential portions of the rotor shroud.
Figure 20:
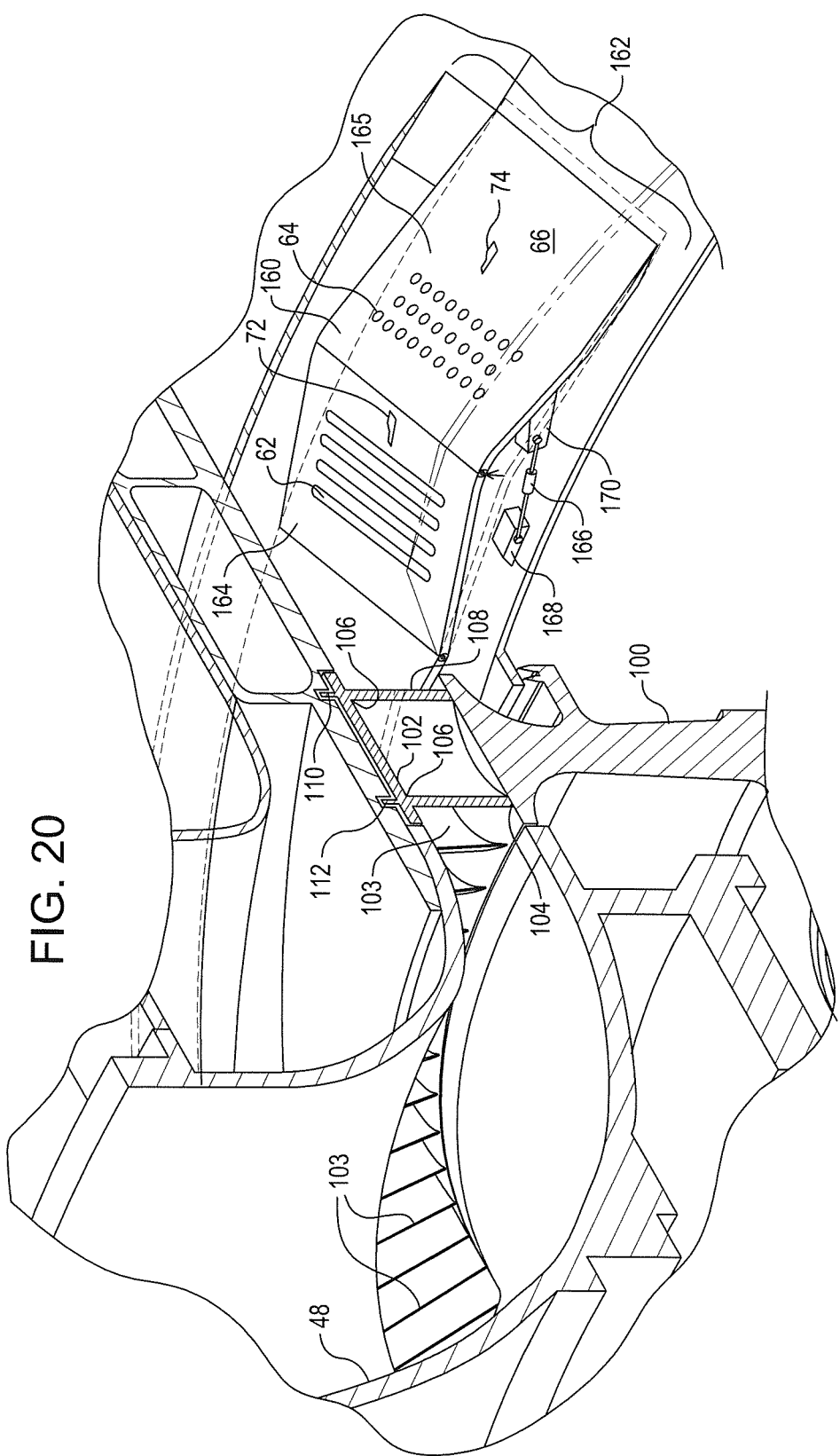
FIG. 20 is a partial cross-sectional view of an embodiment for a compressor, similar to that shown in FIG. 5 above, showing an inlet duct, impulse rotor having a shroud such as just illustrated in FIG. 19, a stator including an aerodynamic duct having geometrically adjustable converging and diverging portions and which is adapted for changing the effective contraction ratio of the aerodynamic duct for starting and setting up a supersonic shock wave in a suitable location, and further showing the use of bleed, injection, and vortex generators for effective control of boundary layer phenomenon.

As shown in FIGS. 19 and 20, in an embodiment, a rotor 100 may be provided having a shroud 102 for blades 103. Such shrouded blades 103 on rotor 100 will be understood by those of skill in the art to be otherwise as just noted above as regards supersonic gas flow on blades 103 from a hub end 104 to a tip end 106 at trailing edge 108. In an embodiment, shroud 102 may include labyrinth seal portions 110 and 112. By use of a labyrinth seal or other suitable seal, such as a honeycomb seal, a dry gas seal, brush seals, etc., the rotor 100 may be effectively sealed with respect to a downstream aerodynamic duct such as duct 162, so as to minimize gas leakage during flow there between.

Figure 5:
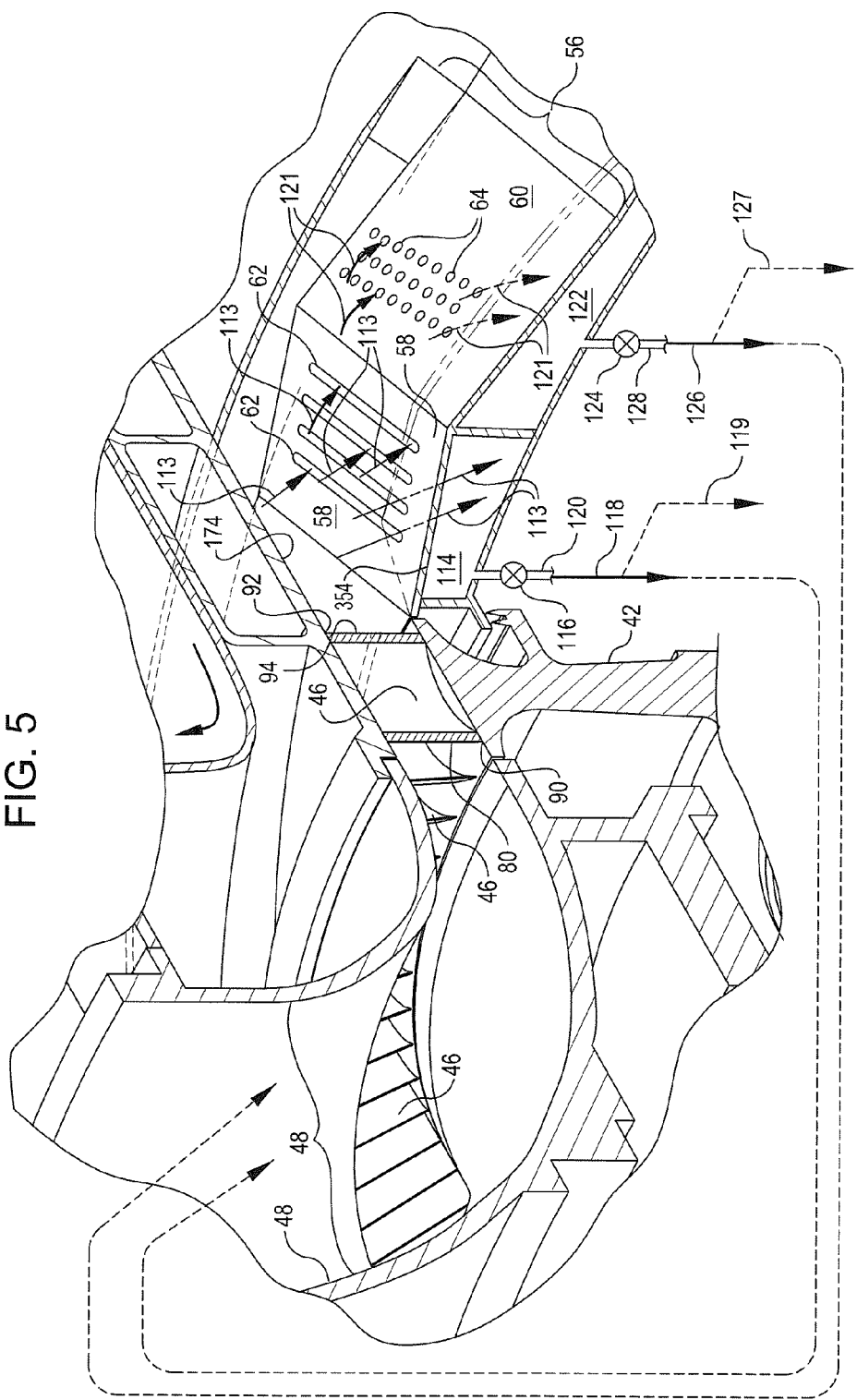
FIG. 5 is a partial cross-sectional and diagrammatic view of a compressor section for a gas turbine engine now showing in more detail the impulse blades on a rotor and a downstream stator that includes a plurality of aerodynamic ducts, showing a helical structure for the aerodynamic ducts having converging and diverging portions, as well as inlet bypass passageways for starting, and boundary layer ports for boundary layer control.
Figure 6:
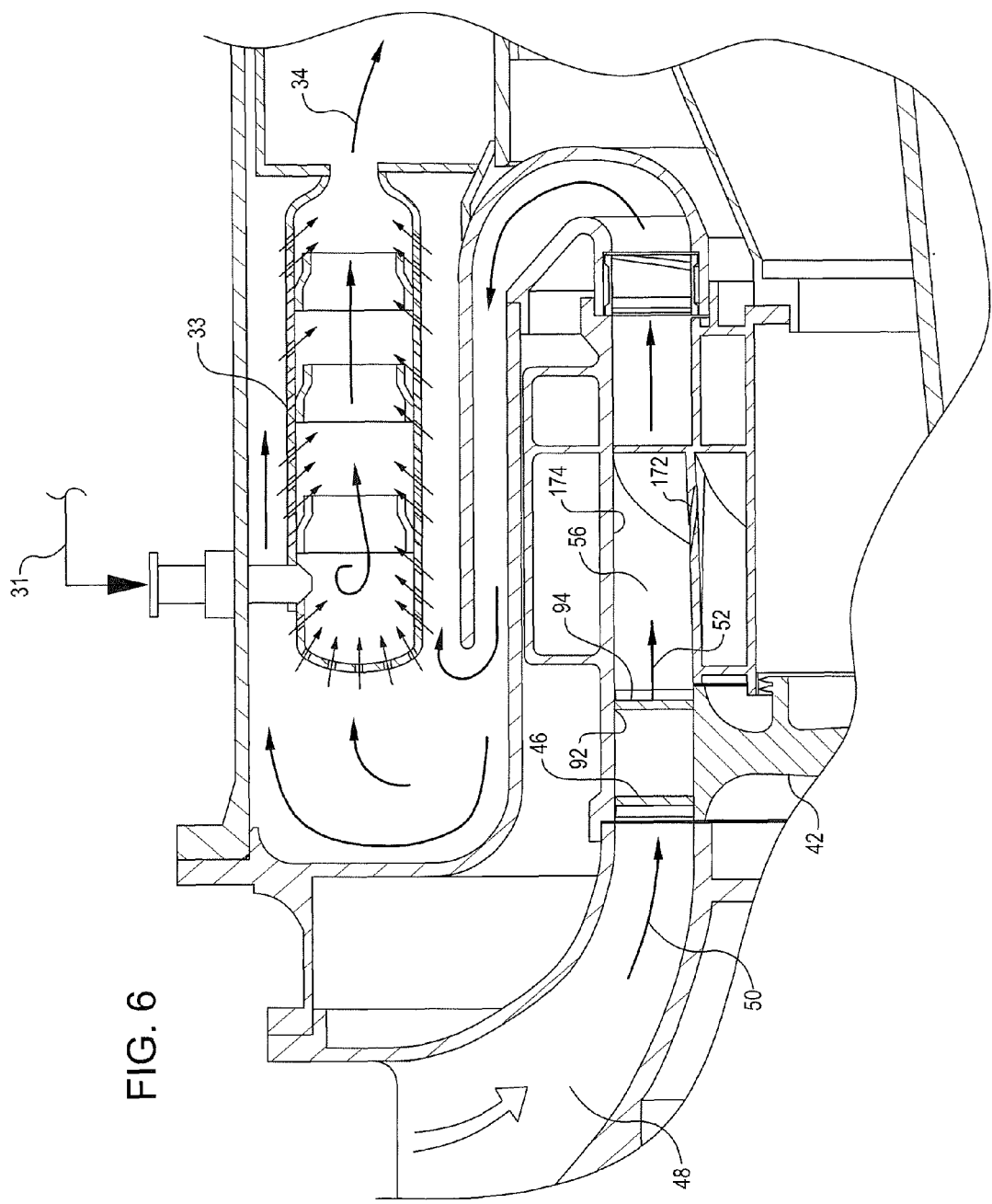
FIG. 6 is a detailed partial cross-sectional view of the compressor section of a gas turbine engine, showing an inlet passageway, impulse blades on a rotor, a stator (i.e. stationary diffuser), a turning vane, and compressed air supply passageways to a burner, as well as fuel input and exhaust output from a burner.

In an embodiment, such as illustrated in FIG. 5, bypass gas passageways 62 may include, in fluid communication therewith, outlet valving 116 positionable between an open, startup condition wherein discharge gas 113 is passed therethrough, and a closed, operating condition which minimizes or stops flow of discharged bypass gas 113. A sub-chamber 114 may be provided for collection of bypass gas 113, with the outlet valving 116 regulating passage of such collected bypass gas 118 outward via external passageways 120. In such embodiment, the aerodynamic ducts 56 have outlets in the form of bypass gas passageways 62 that may be fluidly connected to external passageways 120. In an embodiment, collected bypass gas 118 may be returned by return passageways as shown by broken line 118' to inlet passageway 48. Or, in the case of compression of air, collected bypass gas 118 may be discharged directly to the atmosphere as shown by broken line 119 in FIGS. 5 and 23.

Similarly, in various embodiments, the boundary layer bleed ports 64 may include outlet valving 124 positionable between an open position wherein bleed gas 121 is passed therethrough (see FIG. 5) in order to remove substantial portions of the boundary layer gases, and thus minimize the thickness of such a boundary layer, as will be understood by those of skill in the art, and a closed position which avoids boundary layer removal via removal of bleed gas 121. For example, a boundary layer bleed sub-chamber 122 is shown for collection of bleed gas 121, with outlet valving 124 for passage of collected bleed gas 126 outward by external line 128. In such embodiment, the boundary layer bleed ports 64 from aerodynamic ducts 56 may be fluidly connected to external lines 128. As also shown in FIG. 5, in an embodiment, collected bleed gas 126 may be recycled, optionally shown by broken line 126', and returned to inlet passageway 48. Or, in case of compression of air, the collected bleed gas 126 may be discharged to the atmosphere, as indicated by broken line 127 in FIGS. 5 and 23.

Figure 22:
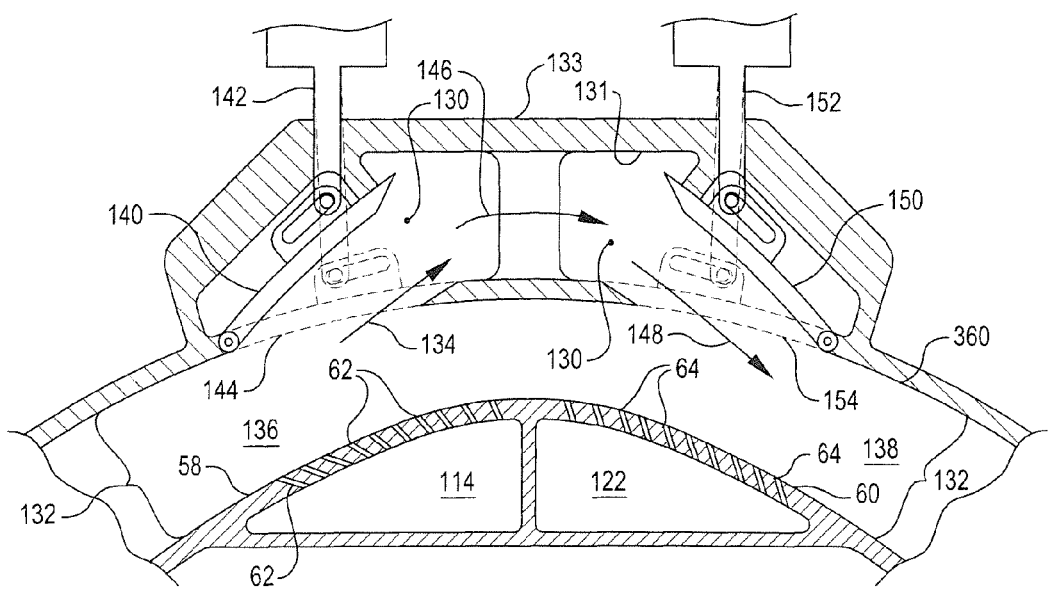
FIG. 22 is a schematic cross-sectional view of an embodiment for an aerodynamic duct including converging and diverging portions, including a stator (i.e., stationary diffuser), illustrating both the use of a gas removal and bypass system for starting, and use of a boundary layer bleed system for control of boundary layer phenomenon.
Figure 23:
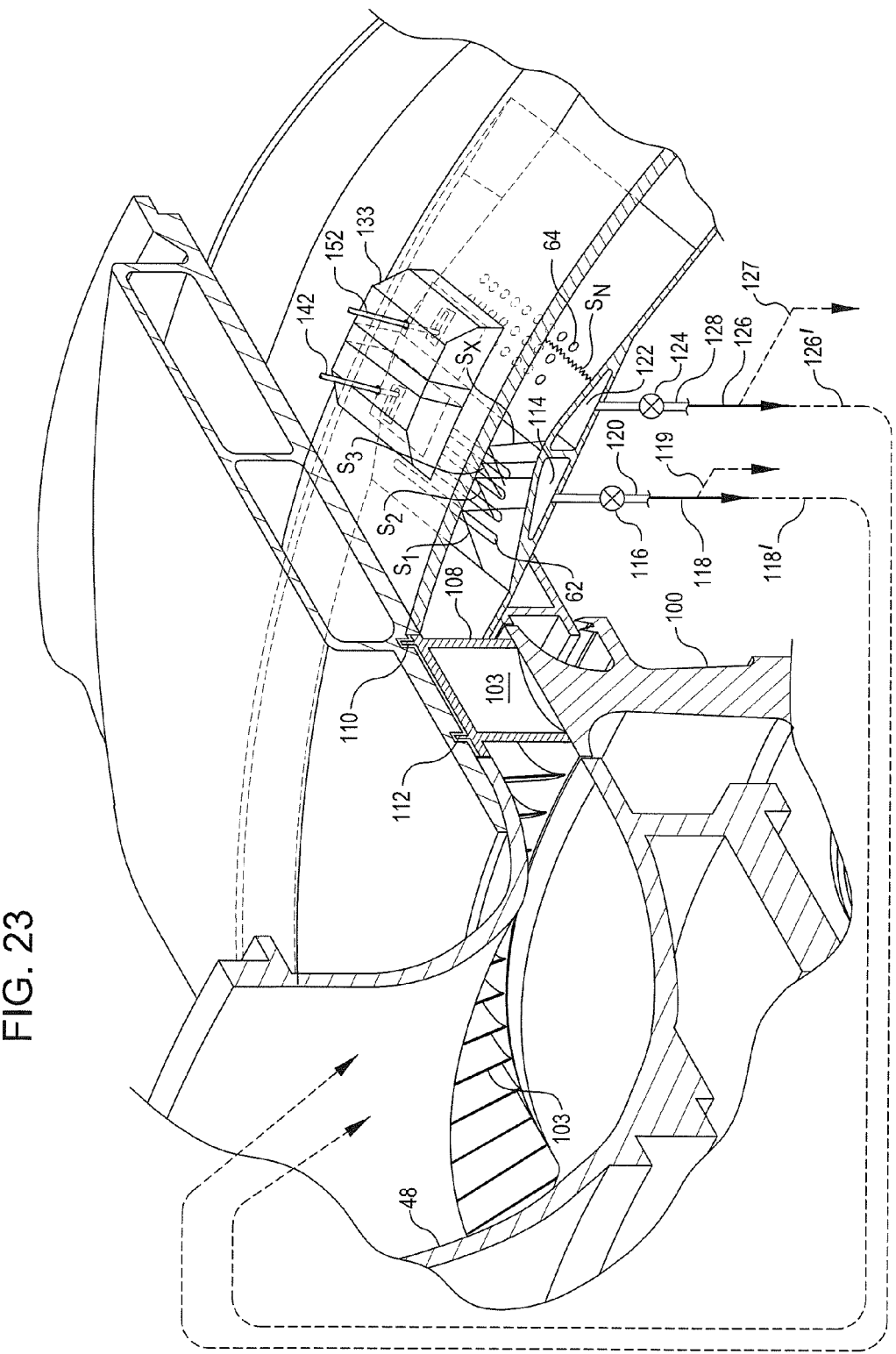
FIG. 23 is a partial cross-sectional perspective view of an embodiment for a compressor, similar to that shown in FIGS. 5 and 20 above, showing an inlet duct, impulse blades with shroud on a rotor, a stator including an aerodynamic duct utilizing a gas removal system for starting of the type just set forth in FIG. 22 above, and further showing the use of a boundary layer bleed system for effective control of boundary layer phenomenon.

In other embodiments, as seen in FIGS. 22 and 23, a compressor may be provided using internal starting bypass gas passageways 130 as defined by internal walls 131 of an internal gas passageway housing 133. In such configuration, the internal bypass gas passageways 130 may be fluidly connected internally within or adjacent the aerodynamic ducts 132, to allow bypass gas 134 to escape a converging portion 136, and return the bypass gas 134 directly to the aerodynamic duct 132, as shown by reference arrow 148 in FIG. 22, to the diverging portion 138 thereof. In an embodiment, a hinged inlet door 140 may be provided with actuator linkage 142 for opening a bypass outlet 144 shown in broken lines. Bypass gas 134 escapes through bypass outlet 144 and is then returned as indicated by reference arrows 146 and 148 in FIG. 22 through bypass return opening 154. A hinged return door 150 may be provided with actuator linkage 152 for opening a bypass return opening 154 shown in broken lines in FIG. 22.

Figure 24:
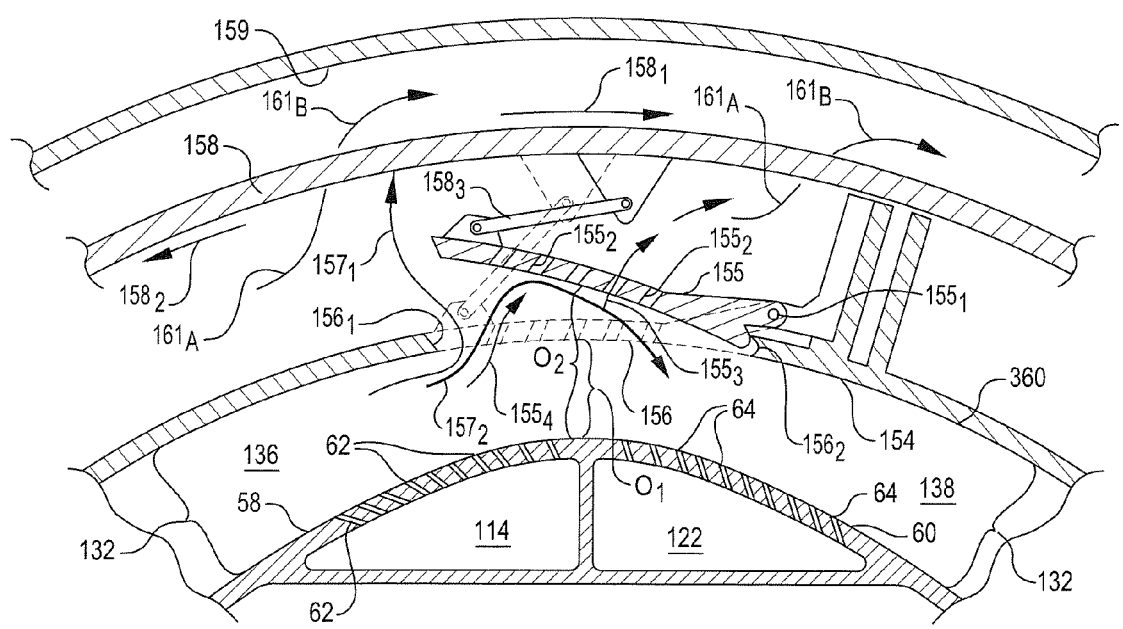
FIG. 24 is a partial cross-sectional view of an embodiment for an aerodynamic duct including converging and diverging portions, illustrating both the use of an openable door for gas removal during starting, and the use of boundary layer bleed systems for control of boundary layer phenomenon.

Attention is directed to FIG. 24, which shows yet another embodiment for achieving startup of a supersonic shock wave in an aerodynamic duct 132. In FIG. 24, a bypass outlet door 155 provides a bypass outlet opening 156 shown in broken lines between end walls $156_1$ and $156_2$ to allow gas shown by reference arrows 157 to escape the converging portion 136 of the aerodynamic duct 132. In an embodiment, an actuator 158 may be provided to move back and forth as noted by reference arrows $158_1$ (to open), and $158_2$ (to close) bypass outlet door 155, using linkage $158_3$ to pivot bypass outlet door 155 about pivot pin $155_1$. Escaping bypass gas noted by reference arrows 157 is contained by bypass gas passageway wall 159, for return or discharge as otherwise described herein. In an embodiment, the bypass outlet door 155 may be provided with boundary layer bleed passages $155_2$, for boundary layer bleed as noted by reference arrows $155_3$ and $155_4$. More generally, startup of the supersonic shock wave is accomplished by opening up bypass gas passageways such as door 155, and then bringing the blades 46 (e.g., FIG. 2) up to full speed. Then, the bypass outlet door may be smoothly closed to bring the throat $O_1$ of aerodynamic duct 132 into a design area condition which establishes a design contraction ration for aerodynamic duct 132. At that point, back pressure, that is the static pressure in diverging portion 138 of aerodynamic duct 132, is allowed to rise to establish the design discharge pressure for operation. Boundary layer control structures may be utilized during operation to control boundary layers, whether by bleed, mixing, injection, combinations thereof, or other suitable means. For shutdown, back pressure is reduced, and drive for blades 46 is turned off, and the compressor is allowed to spin to a stop.

Figure 21:
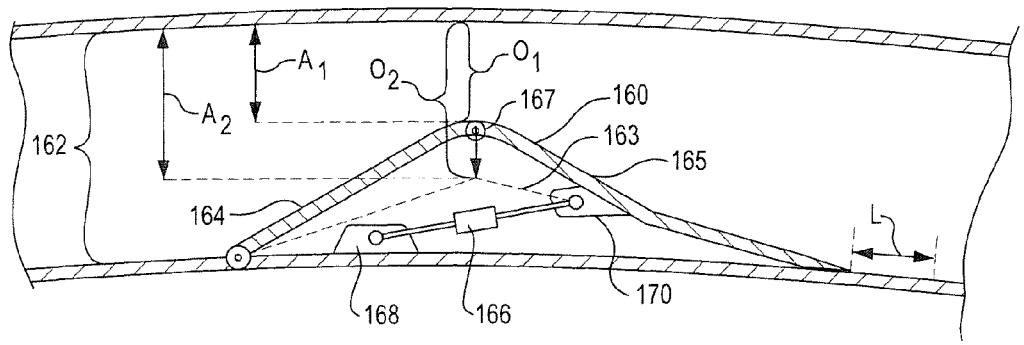
FIG. 21 is a schematic cross-sectional view of an embodiment for adjustable converging and diverging portions located within an aerodynamic duct as first illustrated in FIG. 20 above, now further showing how adjustment of the duct changes the effective contraction ratio (also known as convergence ratio) in the duct by adjusting the area available for passage of gas therethrough.

Turning to FIGS. 20 and 21, a compressor may be provided in an embodiment using geometrically adjustable portions 160 in an aerodynamic duct 162. As seen in FIGS. 20 and 21, a geometrically adjustable portion 160 may be positionable between a location for use in a startup condition shown in broken lines, with a larger throat $O_2$ having area $A_2$ (not shown but corresponding to dimensions at location of $O_2$), wherein the converging portion 164 allows increased flow of a selected gas through the aerodynamic duct 162, and a location for use in an operating condition in which the converging portion 164 is set to a selected operating position, shown in solid lines, with a throat $O_1$ having area $A_1$ (not shown but corresponding to dimensions at location of $O_1$). The adjustment of geometrically adjustable portion 160 to the operating position and thus providing a smaller throat $O_1$ having area $A_1$ shown in solid lines in FIG. 21 allows operation with a higher compression ratio than when geometrically adjustable portion 160 is at the startup position indicated in FIG. 21 by broken lines 163 and providing throat $O_2$ area $A_2$. In other words, the geometrically adjustable portions 160 moves, to change the contraction ratio of an aerodynamic duct 162. In various embodiments, one or more geometrically adjustable portions 160 may be located in one or more of aerodynamic ducts 162, as provided for a particular compressor. As indicated in FIG. 21, in an embodiment, adjustment of a geometrically adjustable portion 160 may include extending the length of the converging portion 164 and diverging portion 165 of a duct 162 by a length L. In an embodiment, such adjustment may be achieved by use of a pivot pin 167. In an embodiment, an actuator 166, extending between an anchor 168 and an attachment point 170, may be provided to move the geometrically adjustable portion 160 and allow movement such as at pivot pin 167.

Returning now to boundary layer control structures, in an embodiment, such structures may be configured as boundary layer bleed ports 64 in the various aerodynamic ducts 56 (e.g., $56_1$ through $56_5$), such as shown in FIG. 2, or in FIG. 5. Such boundary layer bleed ports 64 may be provided by perforations in one or more bounding walls, such as in surface 66 of a diverging portion 60 in an aerodynamic duct as shown in FIG. 2 or 5. Adjacent the boundary layer bleed ports 64 may be bleed sub-chambers, such as sub-chamber 122 noted above with respect to the embodiment depicted in FIG. 5, or as may be seen in FIG. 22. Thus, a bleed sub-chamber 122 may be provided in fluid communication with boundary layer bleed ports 64, and thus bleed sub-chambers 122 may be configured for passage therethrough of gas removed through the boundary layer bleed ports 64. Although the boundary layer bleed ports 64 are shown in a diverging portion 60, such bleed ports may be located in other bounding walls of aerodynamic ducts 56, such as on radially outward portions, or on sidewalls, or on other radial inward portions.

Figure 11:
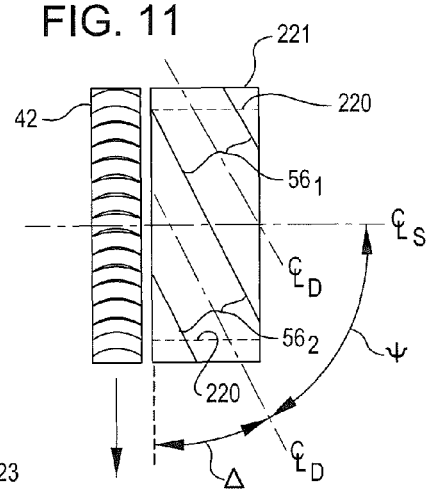
FIG. 11 is a diagrammatic side view for an embodiment for a compressor for a gas turbine engine, depicting the use of an impulse bladed rotor (possible additional blade shroud is not shown) with a stator including a plurality of aerodynamic ducts located around a surface of rotation, in an embodiment helicoidally, and wherein the surface of rotation as indicated by broken lines is generally cylindrical in shape.
Figure 12:
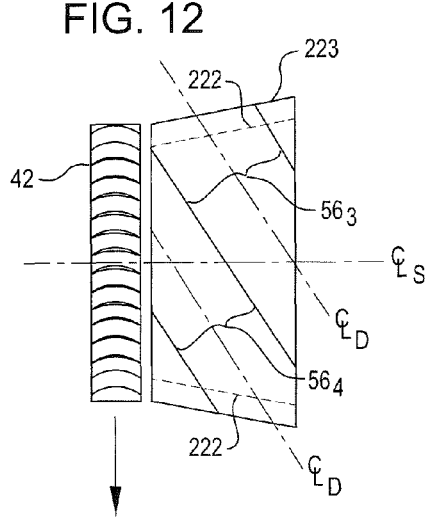
FIG. 12 is a diagrammatic side view for an embodiment for a compressor for a gas turbine engine, depicting the use of an impulse bladed rotor (possible additional rotor shroud is not shown) with a stator including plurality of aerodynamic ducts located around a surface of rotation, in an embodiment in a generally spiral configuration, and wherein the surface of rotation as indicated by broken lines is generally in the shape of an outwardly sloping truncated cone.
Figure 13:
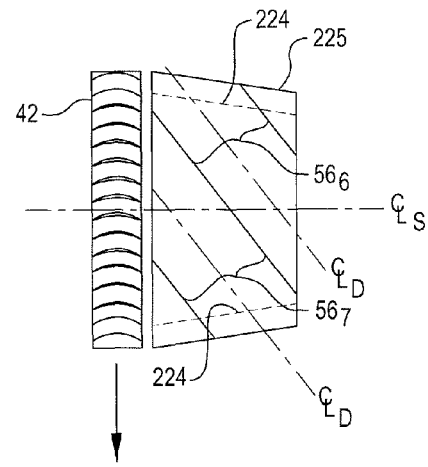
FIG. 13 is a diagrammatic side view for an embodiment for a compressor, depicting the use of an impulse bladed rotor (possible additional shroud is not shown) with a stator including aerodynamic ducts located around a surface of rotation, in an embodiment in a generally spiral configuration, and wherein the surface of rotation as indicated by broken lines is generally in the shape of an inwardly-sloping, truncated cone.
Figure 16:
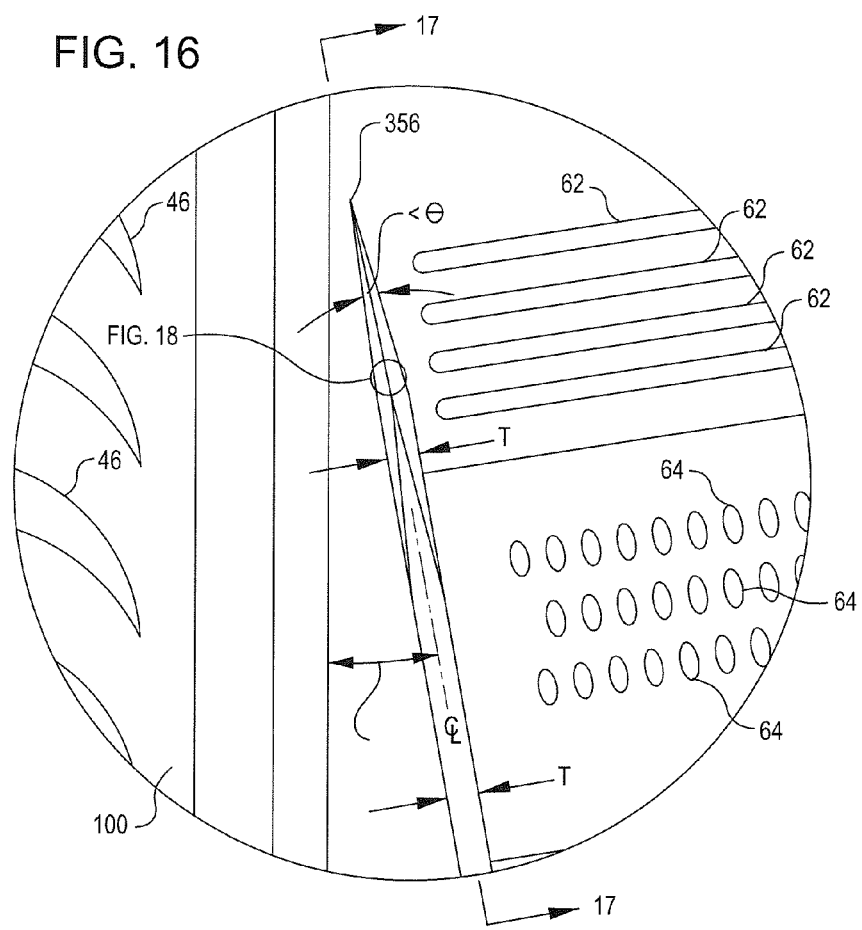
FIG. 16 is an enlarged portion of FIG. 15, showing a leading edge wedge angle for a stator, and a partition wall located rearward, i.e. downstream therefrom which, in an embodiment, may be configured as a common partition to separate adjacent aerodynamic ducts in a stator (i.e. a stationary diffuser).

In various embodiments, as shown in FIGS. 11, 12 and 13, the one or more aerodynamic ducts 56 may be disposed in a stationary diffuser, namely stator 54 as depicted in FIG. 2 above, and may be wrapped around a longitudinal axis, shown along the centerline $C_{LS}$. In an embodiment, as indicated in FIG. 11, one or more of the one or more aerodynamic ducts 56 of a stationary diffuser 221 may be wrapped as if over a substantially cylindrical substrate 220. In such an embodiment, aerodynamic ducts 56 may be wrapped at a substantially constant helical angle psi ($\Psi$) about the longitudinal axis shown along the centerline of the stator, $C_{LS}$. Alternately, the orientation of aerodynamic ducts 56 may be described by use of the complementary lead angle delta ($\Delta$), as shown in FIG. 11. In such an embodiment, the centerline $C_{LD}$ of a first aerodynamic duct 56$_1$ and the centerline $C_{LD}$ of a second aerodynamic duct 56$_2$ (and other ducts in the embodiment) may be parallel. In various embodiments, a helical angle psi ($\Psi$) of from about forty-five degrees (45°) to about eighty degrees (80°) may be employed. In other embodiments, a helical angle psi ($\Psi$) of from about forty-five degrees (45°) to about seventy-five degrees (75°) may be employed. In the designs disclosed herein, it may be advantageous to receive gas in aerodynamic ducts, for example, 56$_1$ in FIG. 11, without turning the flow as delivered from blades 46. In a different design as depicted in FIG. 12, aerodynamic ducts 56$_3$ and 56$_4$ of a diffuser 223 may be wrapped as if over an outwardly expanding conical section as a substrate 222. In yet another and still different alternative embodiment, as seen in FIG. 13, aerodynamic ducts 56$_6$ and 56$_7$ in a diffuser 225 may be wrapped as if over an inwardly decreasing conical section as a substrate 224.

Figure 25:
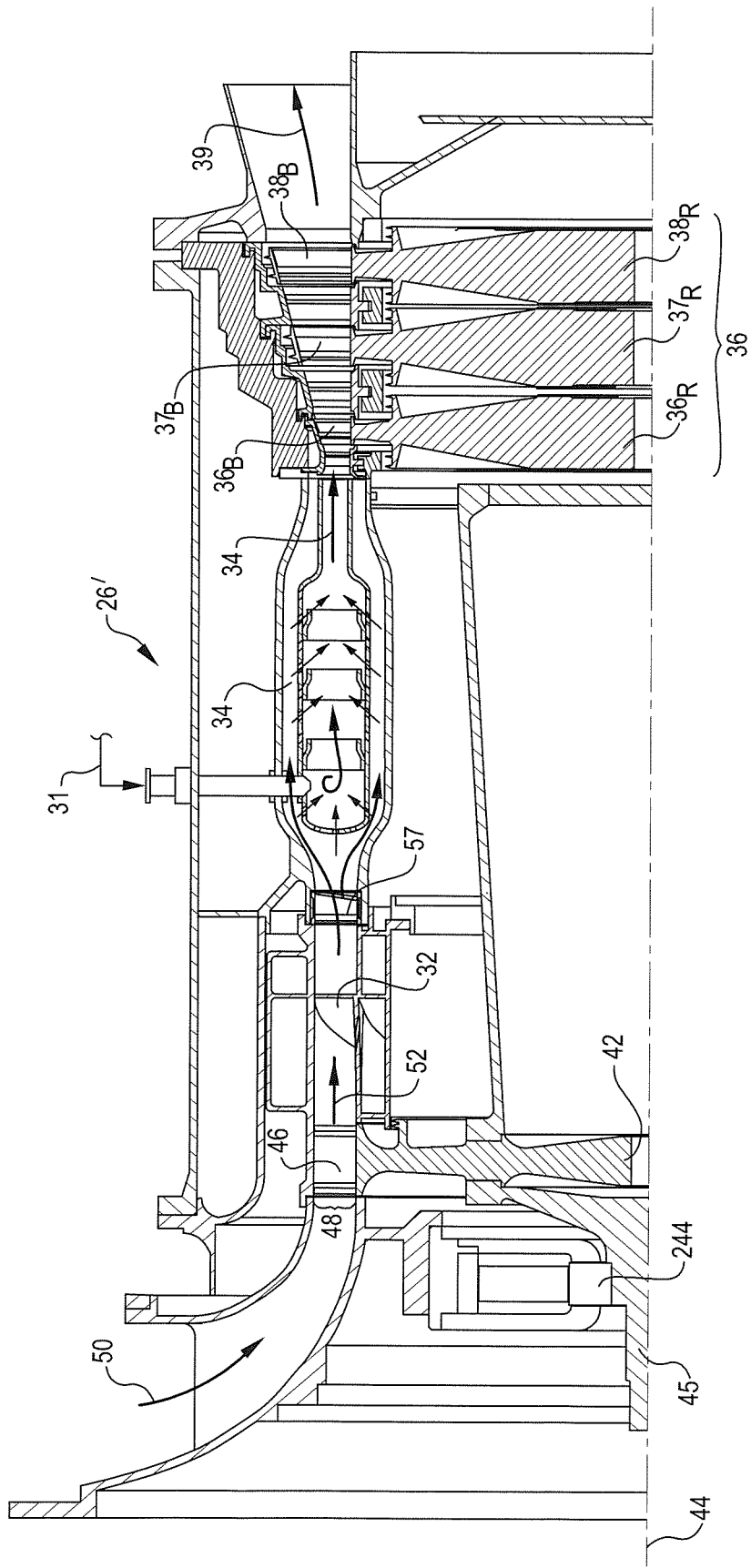
FIG. 25 is a cross-sectional view of the upper portion of an exemplary gas turbine engine, showing use of a substantially linear configuration for the flow of compresssed gas to a burner, and for combustion gas from the burner to the turbine blades.

Overall, as may be envisioned in part from FIG. 4, a gas turbine engine 26 with supersonic gas compressor 28 may be provided for compressing an incoming selected gas 50, where the gas turbine engine 26 includes a casing 250 having a low pressure gas inlet 252 and a combustion gas 39 exit 254. A rotor 42 with blades 46 (or shrouded blades 103 on rotor 100 as shown in FIGS. 19 and 20) may be provided to act on the selected gas 50 to impart velocity thereto to provide a supersonic gas flow 52 (see FIG. 2) to a stator 54 that includes one or more aerodynamic ducts 56. As shown in FIG. 4, provision may also be made for a deswirler 57, located downstream of stator 54, to turn the gas flow toward the burner 33 when required. However, losses associated with deswirler 57 may be minimized, or avoided in some instances, such by using a generally linear gas turbine configuration as depicted in FIG. 25. The rotor 42 with blades 46 (or shrouded blades 103 on rotor 100, as shown in FIGS. 19 and 20) may be driven by shaft 45 from gas turbine 36, the choice of driver type and size, and associated drive train components such as a gearbox or bearings 244, etc., may be selected by those of skill in the art for a particular application.

Figure 9:
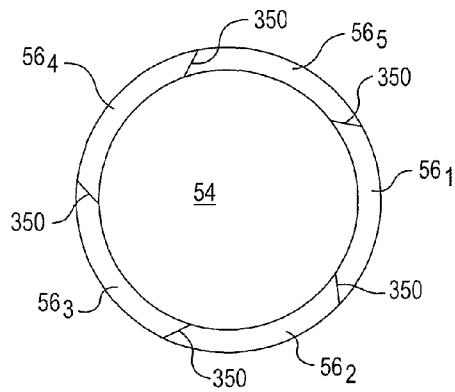
FIG. 9 is a vertical cross-sectional view taken at line 9-9 of FIG. 2, showing an embodiment for an entrance to a stator, here showing five (5) aerodynamic ducts, and further showing short height of leading edges of the aerodynamic ducts.
Figure 10:
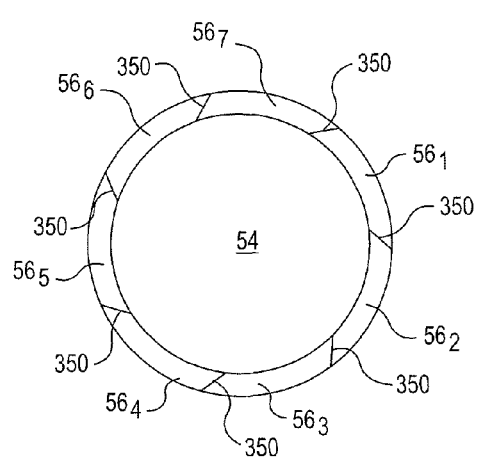
FIG. 10 is a vertical cross-sectional view taken as if at line 10-10 of FIG. 2, but now showing the entrance to an alternate embodiment using a stator (i.e., stationary diffuser) having seven (7) aerodynamic ducts, and further showing a short height for leading edges of the aerodynamic ducts.
Figure 17:
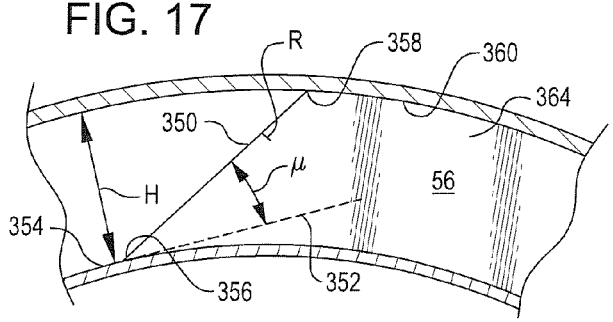
FIG. 17 is cross-section taken across line 17-17 of FIG. 16, showing a leading edge for an aerodynamic duct, and more specifically, how a leading edge may, in an embodiment, be provided in a swept-back configuration, that is sloping rearward in the flowwise direction.
Figure 18:
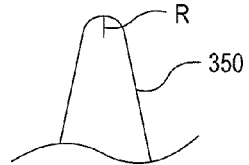
FIG. 18 is an enlarged portion of FIG. 17, showing an exemplary radius for a leading edge of an aerodynamic duct.

An exemplary aerodynamic duct 56 may be provided in a stator 54 of the type shown in FIG. 2. In an embodiment, aerodynamic ducts may be generally helically disposed about a longitudinal axis, such as about centerline $C_{LS}$ of FIG. 11. Aerodynamic ducts may be designed, i.e., sized and shaped, for an inlet relative Mach number for operation associated with a design operating point selected within a design operating envelope for a selected gas composition, gas quantity, and gas compression ratio. A gas turbine compressor design may be configured for a selected mass flow, that is for a particular quantity of gas that is to be compressed, and that gas may have certain inlet conditions with respect to temperature and pressure (or an anticipated range of such conditions), that should be considered in the design. The incoming gas may be relatively pure mixture of gases such as ambient air, or may be a mixture of various elements and/or compounds, or the expected supply gas may be expected to range in composition. And, it may be desired to achieve a particular final pressure, when starting at a given inlet gas pressure, and thus, a desired gas compression ratio should be selected for a particular gas turbine compressor design. Given design constraints such as gas composition, mass flow of gas, inlet conditions, and desired outlet conditions the aerodynamic ducts for a particular compressor should be sized and shaped for operation at a selected inlet Mach number and gas compression ratio. The designs described herein allow use of high gas compression ratios, especially compared to self starting compressor designs that lack the ability to adjust the effective contraction ratio. Thus, the designs provided herein provide for compression in aerodynamic ducts which can be started, as regards swallowing a shock structure and establishing a stable supersonic shock configuration during operation, yet retain design features that enable high pressure ratio operation, including oblique shock structure and throat size to support design throughput and compression pressure ratios As shown in FIG. 2, aerodynamic ducts 56 in stator 54 may be constructed with leading edges 350. Certain details pertinent to various embodiments are shown in FIGS. 9, 10, 15, 16, 17, and 18. In FIG. 9, an embodiment is shown for a stationary stator 54 having five (5) aerodynamic ducts 56$_1$ through 56$_5$, and wherein each of such aerodynamic ducts 56$_1$ through 56$_5$ includes a leading edge 350. In FIG. 10, an embodiment is shown for a stationary stator 54 having seven (7) aerodynamic ducts 56$_1$ through 56$_7$, and wherein each of such aerodynamic ducts includes a leading edge 350. Generally, the sharper the leading edge 350, the better performance will be provided, that is, losses will be minimized, when operating at supersonic conditions at the inlet, as compared to use of a leading edge that is not as sharp. In an embodiment, a leading edge 350 may be provided having a leading edge radius R of from about 0.005 inches to about 0.012 inches, as shown in FIG. 18. The leading edge 350 may be provided using a sharp leading edge wedge angle theta ($\theta$), which may in an embodiment be between about five degrees (5°) and about ten degrees (10°). Also, as seen in FIG. 17, leading edge 350 may be provided sloping rearward, i.e. in a downstream direction at a slope angle mu ($\mu$) as measured between the leading edge 350 and a tangent line 352 with underlying radially inward bounding wall 354. Such sloping leading edge 350 may start at a lower front end 356 and end at an upper rear end 358. The leading edge 350 may be sealed to or affixed to a radially inward bounding wall 354 at the lower front end 356, and may be sealed to or affixed to (for example, using welded assembly) or otherwise sealingly provided (for example, machined from a common workpiece) with respect to radially-outward bounding wall 360 at the upper rear end 358 of leading edge 350.

Rearward (in the downstream, gas flow direction) from leading edge 350, a partition wall 364 may be utilized. In various embodiments, for example as seen in FIG. 14, a common partition wall 364 may be utilized between adjacent aerodynamic ducts 56 for example, between individually identified aerodynamic ducts 56$_1$, 56$_2$, etc., through duct 56$_5$ as depicted in FIGS. 9 and 14. As shown in FIG. 14, partition walls 364 are individually identified as partition walls 364$_1$, 364$_2$, 364$_3$, etc. as appropriate given the number of aerodynamic ducts 56 utilized. In an embodiment, partition walls 364 may be provided with a thickness T of about 0.100 inches, or less. In summary, an efficient compressor may be provided when aerodynamic ducts 56 may be located adjacent one to another. Such design is even more efficient when adjacent aerodynamic ducts 56 have a common partition wall 364 therebetween. In various embodiments, a leading edge 350 may provide an upstream terminus for a partition wall, such as partition wall 364.

In an embodiment, as may be seen by reference to FIG. 2, a stator 54 design may include aerodynamic ducts 56 which may be polygonal in cross-sectional shape, and such shape may include a variety of bounding walls, such as a floor, ceiling, and sidewalls. As used herein, the term radially-inward bounding wall has been used to describe what might be also be considered a floor of an aerodynamic duct. As used herein, the term radially-outward bounding wall has been used to describe what might be also considered a ceiling of an aerodynamic duct. As earlier noted, in an embodiment, aerodynamic ducts 56 may have a flow centerline $C_{LD}$ as shown in FIG. 2. Then, in such embodiment, orthogonal to the centerline line $C_{LD}$, the aerodynamic ducts 56 may be provided having a parallelogram cross-sectional shape, which may be, in an embodiment, a generally rectangular cross-sectional shape at various points along the aerodynamic duct 56. In an embodiment, the centerline $C_{LD}$ may be generally helical. The height H of such a cross-section is shown in FIG. 17, seen radially outward from a radially-inward bounding wall 354 toward a radially-outward bounding wall 360, at an entrance location to an aerodynamic duct 56, namely the lower front end 356 of leading edge 350. The width W of such a cross-section is depicted in FIG. 15 as between (and within) adjacent partition walls $364_1$ and $364_2$. In an embodiment, associated with the just noted cross-sectional shape, the aerodynamic ducts 56 may have an average aspect ratio, expressed as width W to height H, of about two to one (2:1) or more. In an embodiment, the aerodynamic ducts 56 may have an average aspect ratio, expressed as width W to height H, of about three to one (3:1), or more. In an embodiment, the aerodynamic ducts 56 may have an average aspect ratio, expressed as width W to height H, of about four to one (4:1) or more. See FIG. 17 for an example of the dimension of height H, and see FIG. 15 for an example of the dimension of width W.

In various embodiments, as may be appreciated from FIG. 2, as well as from FIGS. 9 and 10, the number of aerodynamic ducts 56 may be selected as useful given other design constraints. The number of aerodynamic ducts 56 included may be one or more, say in the range of from 1 to 11, or more, for example, 3, 5, 7, 9, or 11 aerodynamic ducts 56. The number of aerodynamic ducts 56 for a given design may be selected as part of a design exercise that takes into account various factors including the direction of gas flow leaving the impulse rotor, and the velocity provided thereby, and the degree of growth of adverse boundary layers in configurations of various geometry. In an embodiment, the number of leading edges 350 (for example, see FIG. 17) for an inlet in a stator 54 (for example, see FIG. 2) may be equal to the number of aerodynamic ducts 56 in a stator 54. In many embodiments, design optimization may result in a plurality of aerodynamic ducts 56, so that velocity of gas leaving an impulse blade 46 is maximized and boundary layer growth is minimized. In such embodiments, for example as seen in FIGS. 2 and 14, when optimizing a compressor design, an odd number 3, 5, 7, 9, or 11 of aerodynamic ducts 56 may be provided, and as just mentioned above, the number of leading edges 350 such stator 54 would be eleven (11), or less. Generally, an unequal number of (1) blades on a rotor and (2) leading edges in an aerodynamic duct, should be selected. By selection of an odd number of blades 46 in a rotor 42, an even number of aerodynamic ducts 56 may be provided, for example, 2, 4, 6, 8, 10, or more. In related parameters, in an exemplary diffuser, namely stator 54, the number of leading edges 350 in a stator 54 would be about one half (½) or less than the number of blades 46 provided in a rotor 42. In another embodiment, the number of leading edges 350 in a diffuser, such as stator 54, would be about one quarter (¼) or less than the number of blades in a rotor 42. In a yet more efficient design, it is currently anticipated that the number of leading edges 350 in a stator 54 would be about fifteen percent (15%) or less of the number of blades in a rotor 42. Minimizing the number of leading edges, and related aerodynamic ducts, minimizes drag and efficiency loss compared to various prior art stators, particularly those utilizing stator blades in number commensurate with or equivalent to the number of rotor blades provided.

In addition to improvements in the number, size, and shape of leading edges 350, and related aerodynamic duct 56 components, the provision of on-board supersonic shock starting capability, for example by use of bypass gas passageways, such as bypass gas sub-chambers 114, as shown in FIG. 5 (that is, sub-chambers below the radially inward bounding wall 354 of the aerodynamic duct 56) or internal bypass using internal starting bypass gas passageways 130 as defined by internal walls 131 of an internal gas passageway housing 133 as seen in FIG. 22, provides the ability to design for higher pressure ratios in a supersonic compressor. As an example, but not as a limitation, the bypass gas passageways 130 may be operable during establishment of a supersonic shock during startup, when the compressor 42 is designed for operating at an inlet relative Mach number of about 1.8, for removal of a quantity of from about eleven percent (11%) by mass to about nineteen percent (19%) by mass of the selected gas captured at the inlet by an aerodynamic duct 56. As a further example, but not as a limitation, the bypass gas passageways 130 may be operable during establishment of a supersonic shock during startup, when a compressor is designed for operating at an inlet relative Mach number of about 2.8, for removal of a quantity of from about thirty six percent (36%) by mass to about sixty one percent (61%) by mass of the inlet gas captured at the inlet by an aerodynamic duct 56. Those of skill in the art and to whom this specification is directed will undoubtedly be able to calculate and thus determine suitable bypass gas quantities that may be useful or required for enabling aerodynamic ducts used in a particular stator, given compressor design parameters, to swallow an incipient supersonic shock structure and to thus establish a stable supersonic shock structure at a desired location within the aerodynamic duct(s). Thus, the above noted ranges are provided to give the reader an appreciation of the amount of mass flow that may be required to establish a stable supersonic shock structure, and thus eliminate an un-started condition in the aerodynamic ducts in a stator. Various aspects of starting requirements are discussed by Lawlor, in U.S. Patent Application Publication No. US2009/0196731 A1, Published on Aug. 6, 2009, entitled Method and Apparatus for Starting Supersonic Compressors, which is incorporated herein in its entirety by this reference. In particular, FIG. 3 of that publication provides a graphic illustration of typical ranges suitable for starting bypass gas removal requirements, shown as starting bleed fraction (defined by mass of bypass gas divided by mass of gas captured by the inlet), for aerodynamic ducts in a supersonic compressor operating at a selected inlet relative Mach number.

More generally, a gas turbine engine including a compressor as described herein may be designed for providing gas to aerodynamic ducts, such as aerodynamic duct $56_1$, as shown in FIG. 2, at an inlet relative Mach number in excess of about 1.8. Further, a compressor may be designed for an inlet relative Mach number to aerodynamic ducts of at least 2. Even further, a compressor as described herein may be designed for an inlet relative Mach number to aerodynamic ducts of at least 2.5. And, operation of supersonic compressors described herein is anticipated to be possible at designs having an inlet relative Mach number to aerodynamic ducts in excess of about 2.5. For many applications, a practical design is anticipated to utilize an inlet relative Mach number to aerodynamic ducts between about 2 and about 2.5, inclusive of such bounding parameters. Further, for various applications, as an example and not as a limitation, practical designs may be anticipated to utilize an inlet relative Mach number to aerodynamic ducts 56 in the range of between about 2.5 and about 2.8. For other applications, even higher inlet Mach numbers may be practical in various designs, as an example, especially for those gases in which the speed of sound is relatively low, such as some of the refrigerant gases. On the other hand, for applications handling gases having a very high speed of sound, such as hydrogen, operation at much lower Mach numbers may provide commercially acceptable results. Consequently, the Mach number achievable for various designs should not be considered limited by such above-noted suggestions, as an evaluation of design Mach numbers for particular applications may include a variety of design considerations.

Gas turbine engines with compressors as described herein may be provided for operation within a design operating envelope having a gas compression ratio of at least three (3). In other applications, compressors as described herein may be provided for operation within a design operating envelope having a gas compression ratio in a stage of compression of at least five (5). In yet other applications, compressors as described herein may be provided for operation within a design operating envelope having a gas compression ratio in a stage of compression of from about three point seven five (3.75) to about twelve (12). In yet other applications, compressors as described herein may be provided for operation within a design operating envelope having a gas compression ratio in a stage of compression of from about six (6) to about twelve point five (12.5). In certain applications, compressors as described herein may be provided for operation within a design operating envelope of gas compression ratios in a stage of compression of from about twelve (12) to about thirty (30). In an embodiment, the compressor section of the gas turbine engines described herein may compress air at an isentropic efficiency in excess of ninety percent (90%). In an embodiment, the compressor section of the gas turbine engines described herein may compress air at an isentropic efficiency in excess of ninety five percent (95%).

In general, improved supersonic gas compressor designs taught herein for compressing a selected gas, such as air, are provided for use in gas turbine engines. In an embodiment, an exemplary compressor 28 may utilize a casing 250 having a low pressure gas inlet 252 and a combustion gas 39 exit 254. A rotor 100 with shrouded blades 103, as seen in FIG. 19, may be provided for delivery of a selected gas at supersonic conditions to a stationary diffuser, such as stator 54, having a plurality of aerodynamic ducts 56, as shown in FIG. 2. In an embodiment, the aerodynamic ducts 56 may be wrapped helically in a stator 54. In an embodiment, adjacent aerodynamic ducts may have common partition walls therebetween. The aerodynamic ducts 56 have a converging portion 58 and a diverging portion 60 that with input of a supersonic gas flow generate a plurality of oblique shock waves $S_1$ to $S_X$ as seen, for example, in FIG. 23 and a normal shock wave $S_N$ as the selected gas passes through the aerodynamic duct 56. In various designs, aerodynamic ducts 56 may have an inlet relative Mach number for operation associated with a design operating point selected within a design operating envelope for a selected gas composition, gas quantity, and gas compression ratio. Further, such a compressor may include means for adjusting the effective contraction ratio of some or all of the plurality of aerodynamic ducts 56, or of each of the aerodynamic ducts. The means for adjusting the effective contraction ratio may include bypass gas passageways for discharge of gas 113 from aerodynamic ducts 56 to external discharge 118 or recycle 118' lines as seen in FIG. 5 above. The means for adjusting the effective contraction ratio may include internal bypass gas passageways 130, such as using internal gas passageway housing 133 with inlet doors 140 and outlet doors 150 as conceptually depicted in FIGS. 22 and 23. The means for adjusting effective contraction ratio may include geometrically adjustable portions 160 as seen in FIGS. 20 and 21. Even further, as appropriate for a particular design configuration, means for controlling a boundary layer of gas flowing through each of the plurality of aerodynamic ducts may be provided. The means for controlling boundary layers may include boundary layer outlet bleed ports 64. The means for controlling boundary layers may include the use of inlet jets for injection gas into a boundary layer, to energize the same and increase the velocity of the boundary layer to a velocity more closely matching that of bulk fluid flow at a particular location in an aerodynamic duct. The means for controlling boundary layers may also include the use of one or more vortex generators 72, 74 in an aerodynamic duct 162 (see FIG. 20) to energize a boundary layer by moving gas via a vortex from a higher velocity bulk flow portion into a slower boundary layer flow, to thereby energize the boundary layer flow.

Increasing operational pressure ratio of the compressor section of a gas turbine engine may provide increased cycle efficiency, and thus better ratio of power output to energy (fuel) input. In one example, the compression may be effectively accomplished using the compressor configuration(s) taught herein utilizing rotors with high strength and using a shrouded blade configuration. Such a design should be able to operate at high rotational rates to provide sufficient peripheral speed in order achieve a suitable supersonic design velocity at time of entry of gas to the aerodynamic ducts 56 of a stator 54, as shown in FIG. 2. As an example, with rotor tip speeds in the range of about 2,500 feet per second, using advanced graphite composite construction with shrouded rotor blades, extremely high compression ratios may be achievable using the designs taught herein, depending upon the inlet gas composition. Further advances in materials and manufacturing techniques may enable designs at even higher speeds and pressure ratios, or may provide reduced risk of mechanical failures when operating at or near the just noted design parameters.

Further to the details noted above, it should be reiterated that the aerodynamic ducts described herein may be utilized in configurations built on various substrate structural designs, and achieve the benefit of high compression ratio operation, while providing necessary features for starting of supersonic operation. In various embodiments, a plurality of aerodynamic ducts may be configured as if wrapped about a surface of revolution, as provided by such static structure. In an embodiment, a suitable static structure may be substantially cylindrical, and thus, in an embodiment, the ducts may be configured wrapped around the cylindrical structure. In an embodiment, the aerodynamic ducts of a stationary diffuser may be provided in a spiral configuration. In an embodiment the aerodynamic ducts of a stationary diffuser may be provided in helicoidal configuration, such as may be generated along a centerline by rotating an entrance plane shape about a longitudinal axis at a fixed rate and simultaneously translating it in the downstream direction of the longitudinal axis, also at a fixed rate. Thus, the term wrapped around a longitudinal axis shall be considered to include wrapping around such various shapes, as applicable.

In summary, the various embodiments using aerodynamic ducts with internal compression ramps configured as taught herein provide significantly improved performance over prior art bladed stator designs operating at supersonic inlet conditions, particularly in their ability to provide high total and static pressure ratios. In one aspect, this is because utilizing a minimum number of aerodynamic ducts, and associated leading edge structures, reduces loss associated with entry of high velocity gas into a diffuser. Moreover, the reduced static structure correspondingly reduces compressor weight and cost, especially compared to prior art designs utilizing large numbers of conventional airfoil shaped stator blades. Thus, incorporation of the novel compressor design described herein enables construction of a high efficiency, yet small and compact, gas turbine engine.

In the foregoing description, for purposes of explanation, numerous details have been set forth in order to provide a thorough understanding of the disclosed exemplary embodiments for the design of a novel gas turbine engine utilizing a supersonic compressor system for the efficient compression of gases. However, certain of the described details may not be required in order to provide useful embodiments, or to practice a selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in a method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

From the foregoing, it can be understood by persons skilled in the art that a gas turbine engine has been provided for the efficient production of shaft power, which may be utilized for a variety of end uses. Although only certain specific embodiments of the present invention have been shown and described, there is no intent to limit this invention by these embodiments. Rather, the invention is to be defined by the appended claims and their equivalents when taken in combination with the description.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to this invention should be limited only by the claims set forth herein, and the legal equivalents thereof.

We claim:

1. A gas turbine engine, comprising:
   (a) a compressor section, said compressor section comprising:
      (1) an inlet for supply of a selected oxidant-containing gas;
      (2) a rotor extending along a longitudinal axis, the rotor comprising a plurality of impulse blades configured to act on said selected oxidant-containing gas to impart axial and tangential velocity thereto to provide a supersonic gas flow;
      (3) a stator, said stator comprising
         (i) one or more aerodynamic ducts each having a radially converging portion and a radially diverging portion that, with input of said supersonic gas flow, generate a plurality of shock waves as said oxidant-containing gas passes through said one or more aerodynamic ducts, each of said one or more aerodynamic ducts sized and shaped to decelerate said supersonic gas flow to subsonic conditions, said one or more aerodynamic ducts having an inlet relative Mach number for operation,
         (ii) bypass gas passageway(s) operable to adjust an effective contraction ratio of some or all of said one or more aerodynamic ducts, and
         (iii) boundary layer control structures;
   (b) a gas turbine section, said gas turbine section comprising
      (1) a high pressure combustion chamber for receiving said selected oxidant-containing gas from said compressor section,
      (2) a combustor for receiving fuel from a fuel supply and said selected oxidant-containing gas from said compressor section and to burn said fuel to create hot pressurized exhaust gases exiting therefrom,
      (3) one or more gas turbines, said gas turbines operatively affixed to a shaft, said one or more gas turbines configured to receive said hot pressurized exhaust gases and to expand said hot pressurized exhaust gases therethrough, to produce shaft power.

2. Apparatus for a gas turbine engine, comprising:
   a compressor section, said compressor section comprising
      (1) a casing comprising a low pressure gas inlet and a high pressure gas exit;
      (2) a rotor extending along a longitudinal axis, the rotor comprising a plurality of impulse blades and configured to act on a selected oxidant-containing gas to impart axial and tangential velocity thereto to provide a supersonic gas flow; and
      (3) a stator comprising one or more aerodynamic ducts configured for diffusing the supersonic gas flow received therein, said one or more aerodynamic ducts each having a radially converging portion, a radially diverging portion, and an effective contraction ratio, such that, with input of the supersonic gas flow, each of said one or more aerodynamic ducts generates a plurality of oblique shock waves $S_1$ to $S_x$ and a normal shock wave $S_N$ in said selected oxidant-containing gas as said selected oxidant-containing gas passes therethrough, said one or more aerodynamic ducts having an inlet relative Mach number for operation associated with a design operating point selected within a design operating envelope for a selected gas composition, gas quantity, and gas compression ratio, said one or more aerodynamic ducts comprising
         (a) bypass gas passageways operable to adjust said effective contraction ratio, and
         (b) boundary layer control structures comprising outlet bleed ports for boundary layer removal.

3. The apparatus as set forth in claim 1, or in claim 2, wherein one or more of said one or more aerodynamic ducts are wrapped helically about said longitudinal axis.

4. The apparatus as set forth in claim 3, wherein one or more of said aerodynamic ducts are wrapped at a substantially constant helical angle about said longitudinal axis.

5. The apparatus as set forth in claim 4, wherein said substantially constant helical angle is in a range of from forty-five degrees (45°) to eighty degrees (80°).

6. The apparatus as set forth in claim 1, or in claim 2, wherein each of said one or more aerodynamic ducts comprises a leading edge associated therewith.

7. The apparatus as set forth in claim 6, wherein said leading edge comprises a leading edge radius of from 0.005 inches to 0.012 inches.

8. The apparatus as set forth in claim 6, wherein said leading edge defines a leading edge wedge angle theta (θ) of between five degrees)(5°) and ten degrees (10°).

9. The apparatus as set forth in claim 6, further comprising a partition wall downstream from said leading edge.

10. The apparatus as set forth in claim 9, wherein the one or more aerodynamic ducts comprises a plurality of aerodynamic ducts, and said partition wall divides adjacent aerodynamic ducts, and wherein said leading edge comprises an upstream terminus of said partition wall.

11. The apparatus as set forth in claim 1, or in claim 2, wherein said plurality of impulse blades comprises a number B of impulse blades, and wherein a number N of aerodynamic ducts are provided, and wherein B and N are selected to avoid harmonic interference between said plurality of impulse blades and said aerodynamic ducts.

12. The apparatus as set forth in claim 6, wherein the number of leading edges in said stator is eleven (11) or less.

13. The apparatus as set forth in claim 11, wherein the number of leading edges in said stator is one half (½) or less than the number B of impulse blades in said rotor.

14. The apparatus as set forth in claim 11, wherein the number of leading edges in said stator is one quarter (¼) or less than the number B of impulse blades in said rotor.

15. The apparatus as set forth in claim 11, wherein the number of leading edges in said stator is fifteen percent (15%), or less, of the number B of impulse blades in said rotor.

16. The gas turbine engine as set forth in claim 1, wherein said selected oxidant-containing gas comprises air.

17. The gas turbine engine as set forth in claim 1, wherein said rotor further comprises a shroud for said plurality of impulse blades.

18. The gas turbine engine as set forth in claim 1, wherein said rotor is effectively sealed with said stator, so as to minimize leakage of said selected oxidant-containing gas during flow therebetween.

19. The gas turbine engine as set forth in claim 1, wherein said selected oxidant-containing gas passing through said plurality of impulse blades is turned by an angle alpha (a) of at least ninety (90) degrees.

20. The gas turbine engine as set forth in claim 1, wherein said selected oxidant-containing gas passing through said plurality of impulse blades is turned by an angle alpha (a) of at least one hundred (100) degrees.

21. The gas turbine engine as set forth in claim 1, wherein said selected oxidant-containing gas passing through said plurality of impulse blades is turned by an angle alpha (a) of at least one hundred ten (110) degrees.

22. The gas turbine engine as set forth in claim 1, wherein said selected oxidant-containing gas passing through said plurality of impulse blades is turned by an angle alpha (a) of between about ninety (90) degrees and about one hundred sixty (160) degrees.

23. The gas turbine engine as set forth in claim 1, wherein said selected oxidant-containing gas passing through said plurality of impulse blades is turned by an angle alpha (a) of between one hundred (112) degrees and one hundred fourteen (114) degrees.

24. The gas turbine engine as set forth in claim 1, wherein each of said plurality of impulse blades has a hub end, a tip end, and a trailing edge, and said supersonic gas flow is provided at said trailing edge of each of said plurality of impulse blades from said hub end to said tip end.

25. The apparatus as set forth in claim 1, wherein said one or more aerodynamic ducts each have a centerline, and wherein orthogonal to said centerline, said one or more aerodynamic ducts each have a generally parallelogram cross-sectional shape.

26. The apparatus as set forth in claim 25, wherein associated with said cross-sectional shape, said one or more aerodynamic ducts have an average aspect ratio, expressed as width to height, of two to one (2:1).

27. The apparatus as set forth in claim 25, wherein associated with said cross-sectional shape, said one or more aerodynamic ducts have an average aspect ratio, expressed as width to height, of three to one (3:1).

28. The apparatus as set forth in claim 25, wherein associated with said cross-sectional shape, said one or more aerodynamic ducts have an average aspect ratio, expressed as width to height, of four to one (4:1).

29. The apparatus as set forth in claim 1, or in claim 2, wherein said inlet relative Mach number of said one or more aerodynamic ducts is 1.8.

30. The apparatus as set forth in claim 1, or in claim 2, wherein said inlet relative Mach number of said one or more aerodynamic ducts is 2.

31. The apparatus as set forth in claim 1, or in claim 2, wherein said inlet relative Mach number of said one or more aerodynamic ducts is 2.5.

32. The apparatus as set forth in claim 1, or in claim 2, wherein said compressor section comprises at least one compression stage having a gas compression ratio of 5.

33. The apparatus as set forth in claim 32, wherein said compressor section comprises at least one compression stage having a gas compression ratio of from 12 to 30.

34. The apparatus as set forth in claim 33, wherein said compressor section comprises at least one compression stage having a gas compression ratio of from 6 to 12.5.

35. The apparatus as set forth in claim 1, or in claim 2, wherein compression in said one or more aerodynamic ducts is accomplished in a channel between spaced apart sidewalls.

36. The apparatus as set forth in claim 1, or in claim 2, wherein said compressor section compresses air at an isentropic efficiency in excess of ninety (90) percent.

37. The apparatus as set forth in claim 1, or in claim 2, wherein said compressor section compresses the selected oxidant-containing gas at an isentropic efficiency in excess of ninety five (95) percent.

38. The apparatus as set forth in claim 1, wherein said stator further comprises a geometrically adjustable portion operable to adjust the effective contraction ratio of some or all of said one or more aerodynamic ducts.

39. The gas turbine engine as set forth in claim 38, wherein said geometrically adjustable portion is positionable between an open, startup condition wherein said radially converging portion of each of said one or more aerodynamic ducts allows sufficient flow of said selected oxidant-containing gas through said one or more aerodynamic ducts to establish and position a normal shock within said one or more aerodynamic ducts, and a closed, operating condition in which said radially converging portion of each of said one or more aerodynamic ducts is set to a selected operating position.

40. The gas turbine engine as set forth in claim 38, wherein said geometrically adjustable portion disposed in each of said one or more aerodynamic ducts, by change in position, changes the effective contraction ratio of the aerodynamic duct in which it is disposed.

41. The gas turbine engine as set forth in claim 40, wherein said geometrically adjustable portion further comprises a pivotable member and an actuator, said pivotable member driven by said actuator, and wherein said geometrically adjustable portion is sized and shaped to change the shape of said radially converging portion of the one or more aerodynamic ducts in which the geometrically adjustable portion is disposed when said geometrically adjustable portion is moved with said actuators.

42. The apparatus as set forth in claim 2, further comprising a gas turbine section, said gas turbine section comprising:

(1) a high pressure combustion chamber for receiving said selected oxidant: containing gas from said compressor section,
(2) a combustor for receiving fuel from a fuel supply, said selected oxidant: containing gas from said compressor section and to burn said fuel to create hot pressurized exhaust gases exiting therefrom,
(3) one or more gas turbines, said gas turbines operatively affixed to a shaft, said one or more gas turbines configured to receive said hot pressurized exhaust gases and to expand said hot pressurized exhaust gases therethrough, to produce shaft power.

43. The apparatus as set forth in claim 42, wherein said one or more gas turbines includes at least one axial turbine.

44. The apparatus as set forth in claim 2, wherein said one or more aerodynamic ducts further comprise geometrically adjustable portions operable to adjust said effective contraction ratio.

45. The apparatus as set forth in claim 2, wherein said boundary layer control structures further comprise (1) inlet jets for energizing a boundary layer by gas injection, or (2) one or more vortex generators, or both.

* * * * *